(12) United States Patent
Takahashi et al.

(10) Patent No.: US 9,203,520 B2
(45) Date of Patent: Dec. 1, 2015

(54) DETECTING APPARATUS, OPTICAL RECEIVING APPARATUS, DETECTING METHOD, AND OPTICAL RECEIVING METHOD

(71) Applicant: Fujitsu Optical Components Limited, Kawasaki-shi, Kanagawa (JP)

(72) Inventors: Kensuke Takahashi, Kawasaki (JP); Shinichi Sakuramoto, Kawasaki (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 252 days.

(21) Appl. No.: 14/045,389

(22) Filed: Oct. 3, 2013

(65) Prior Publication Data

US 2014/0029958 A1 Jan. 30, 2014

Related U.S. Application Data

(63) Continuation of application No. PCT/JP2011/059749, filed on Apr. 20, 2011.

(51) Int. Cl.
*H04B 10/06* (2006.01)
*H04B 10/60* (2013.01)
*H04B 10/69* (2013.01)

(52) U.S. Cl.
CPC .............. *H04B 10/60* (2013.01); *H04B 10/695* (2013.01)

(58) Field of Classification Search
CPC ....................................................... H04B 10/60
See application file for complete search history.

(56) References Cited

U.S. PATENT DOCUMENTS

| 4,529,941 | A  | * | 7/1985 | Lipoff ........................... 329/303 |
| 5,875,049 | A  | * | 2/1999 | Asano et al. .................. 398/202 |
| 5,881,055 | A  | * | 3/1999 | Kondo ........................... 370/311 |
| 6,556,559 | B1 | * | 4/2003 | Mitsume et al. ............... 370/350 |
| 6,907,202 | B1 | * | 6/2005 | Ide et al. ....................... 398/208 |
| 7,046,122 | B1 | * | 5/2006 | Forster ...................... 340/10.33 |
| 7,742,706 | B2 | * | 6/2010 | Uchikata ....................... 398/208 |
| 9,094,134 | B2 | * | 7/2015 | Noda et al. ........................... 1/1 |
| 2005/0123013 | A1 | * | 6/2005 | Nishimura ................. 372/38.03 |
| 2007/0086791 | A1 | * | 4/2007 | Noya et al. .................... 398/202 |

(Continued)

FOREIGN PATENT DOCUMENTS

CN 101563843 10/2009
JP 2000-115218 4/2000

(Continued)

OTHER PUBLICATIONS

Japanese Office Action issued Sep. 9, 2014 in corresponding Japanese Patent Application No. 2013-510782.

(Continued)

*Primary Examiner* — Ken Vanderpuye
*Assistant Examiner* — Amritbir Sandhu
(74) *Attorney, Agent, or Firm* — Staas & Halsey LLP

(57) ABSTRACT

A detecting apparatus includes a threshold detection circuit that detects by a switchable time constant, a threshold of a level of an input optical burst signal; an input detection circuit that detects input of the optical burst signal; a level detection circuit that detects a level of the optical burst signal; a switching circuit that switches the time constant when a period that corresponds to the level detected by the level detection circuit has elapsed after the input is detected by the input detection circuit; and an output circuit that outputs the threshold detected by the threshold detection circuit.

13 Claims, 19 Drawing Sheets

(56) References Cited

U.S. PATENT DOCUMENTS

| | | | |
|---|---|---|---|
| 2008/0309407 A1* | 12/2008 | Nakamura et al. | 330/253 |
| 2008/0310861 A1* | 12/2008 | Wong et al. | 398/210 |
| 2009/0009246 A1* | 1/2009 | Hara et al. | 330/254 |
| 2009/0022502 A1* | 1/2009 | Tsunoda | 398/202 |
| 2009/0142074 A1* | 6/2009 | Ide | 398/202 |
| 2009/0245454 A1* | 10/2009 | Matsuno et al. | 377/19 |
| 2009/0252504 A1* | 10/2009 | Noda et al. | 398/202 |
| 2009/0290670 A1* | 11/2009 | Eng et al. | 375/360 |
| 2009/0310979 A1* | 12/2009 | Hara | 398/209 |
| 2009/0322381 A1* | 12/2009 | Goebuchi | 327/73 |
| 2010/0067924 A1* | 3/2010 | Noda et al. | 398/202 |
| 2010/0176363 A1* | 7/2010 | Takahashi et al. | 257/2 |
| 2011/0170874 A1* | 7/2011 | Sakuramoto et al. | 398/140 |
| 2013/0108278 A1* | 5/2013 | Azadeh et al. | 398/202 |
| 2013/0108280 A1* | 5/2013 | Azadeh et al. | 398/210 |
| 2013/0279905 A1* | 10/2013 | Brown et al. | 398/37 |
| 2013/0343769 A1* | 12/2013 | Noda et al. | 398/202 |
| 2015/0163010 A1* | 6/2015 | Umeda | |
| 2015/0171957 A1* | 6/2015 | Featherston et al. | |

FOREIGN PATENT DOCUMENTS

| | | |
|---|---|---|
| JP | 2007-274032 | 10/2007 |
| JP | 2008-312216 | 12/2008 |
| JP | 2009-177577 | 8/2009 |
| JP | 2009177577 A * | 8/2009 |

OTHER PUBLICATIONS

PCT International Preliminary Report on Patentability mailed Oct. 31, 2013 in corresponding International Application No. PCT/JP2011/059749.

Office Action mailed Jun. 2, 2015 for corresponding Chinese Patent Application No. 201180070204.7.

International Search Report mailed Jun. 7, 2011 in corresponding International Application No. PCT/JP2011/059749.

* cited by examiner

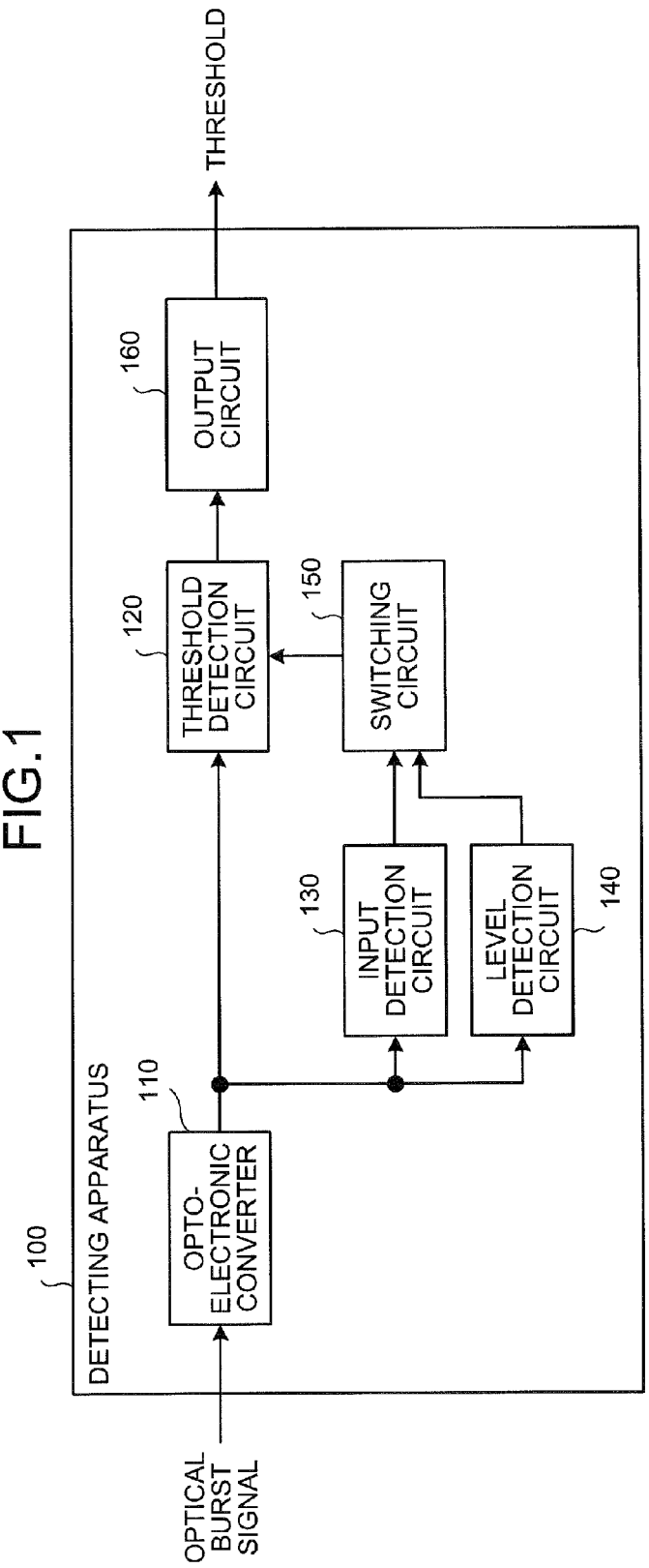

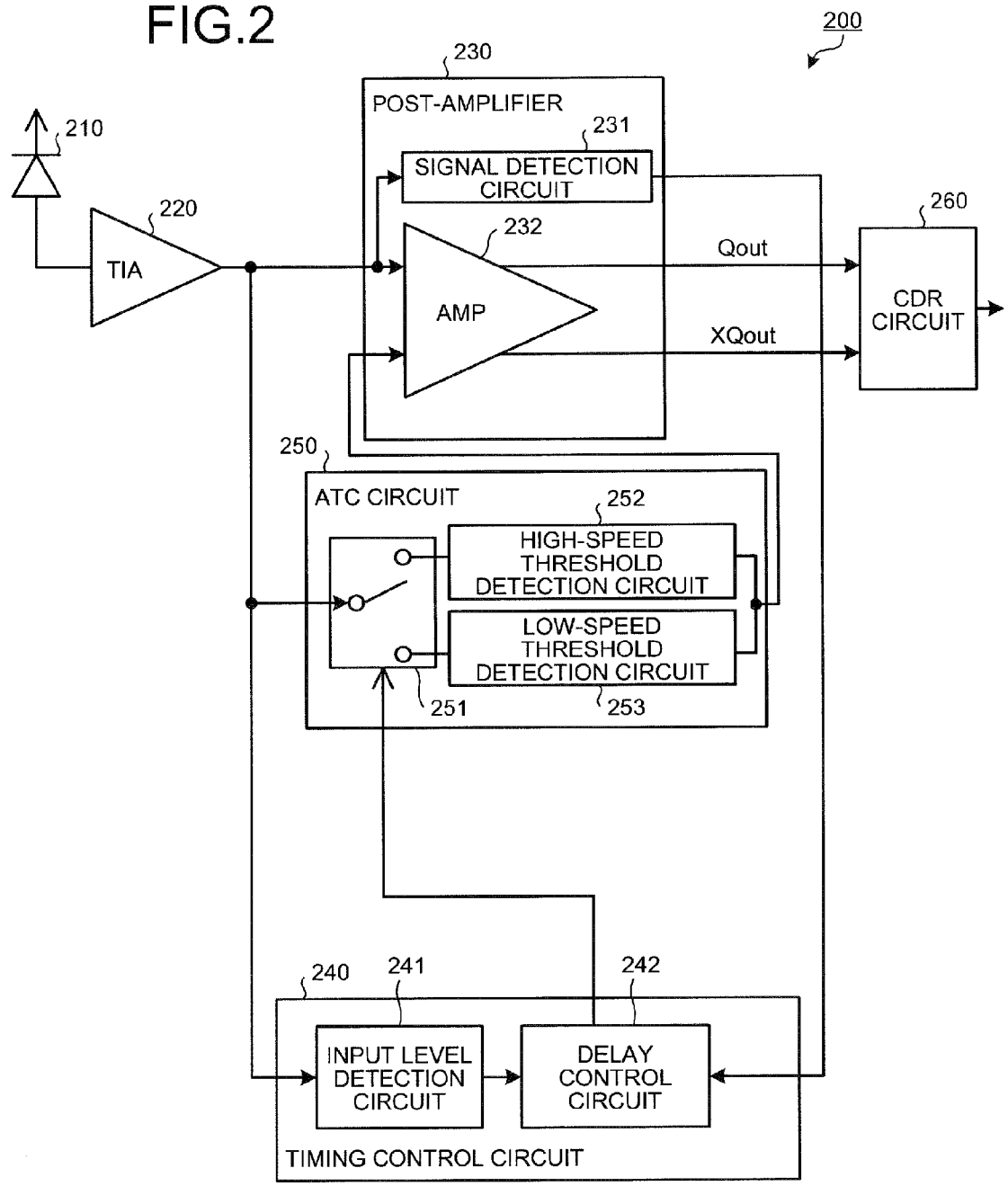

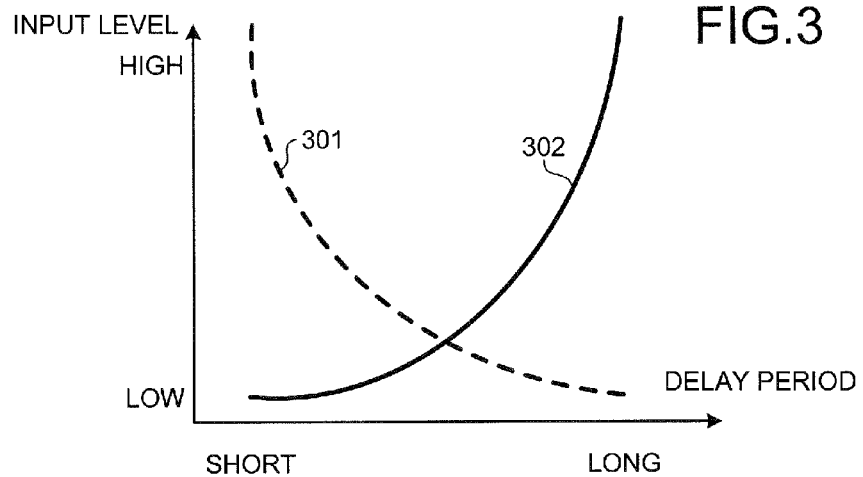
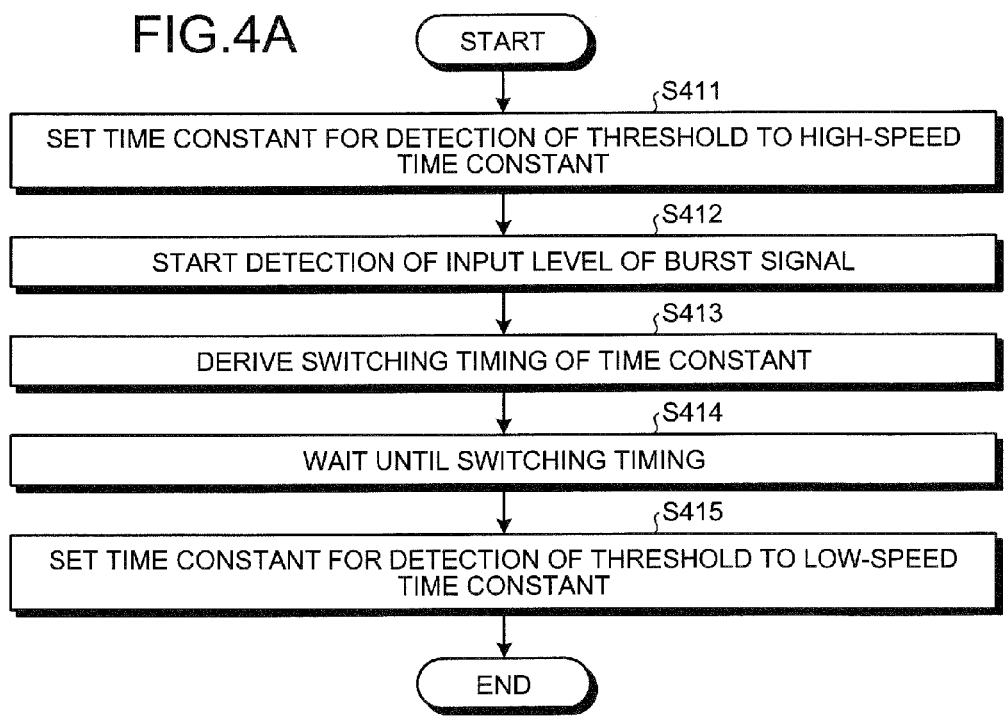

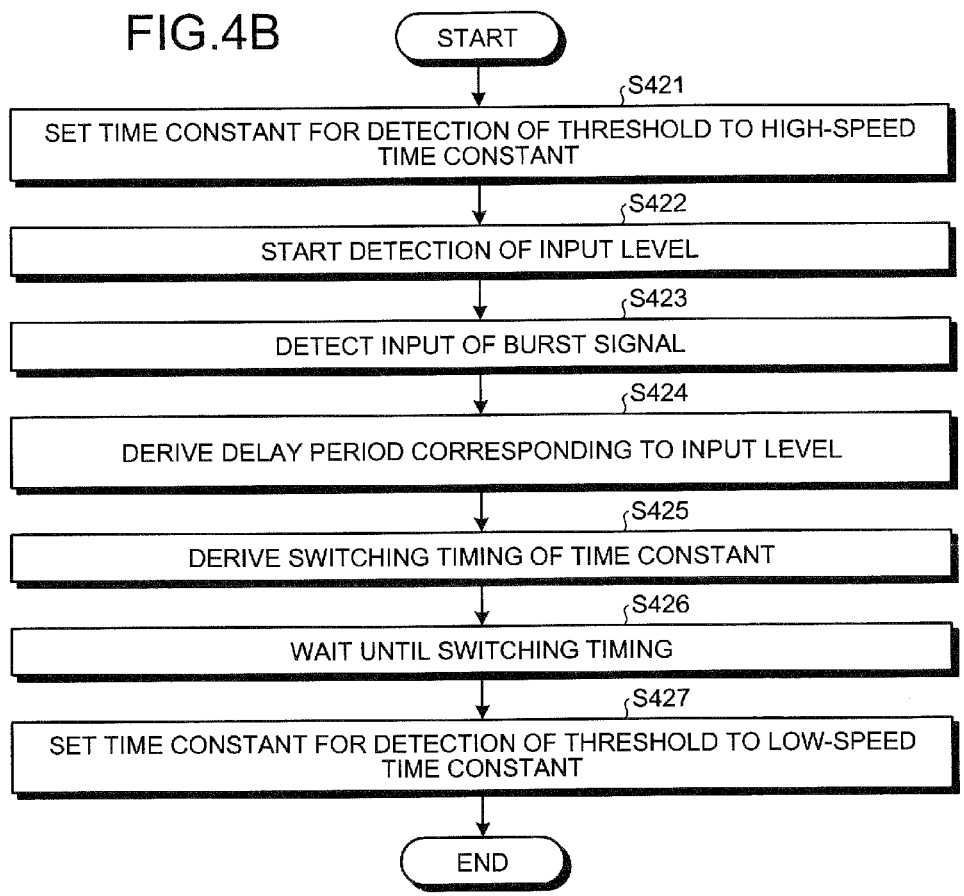

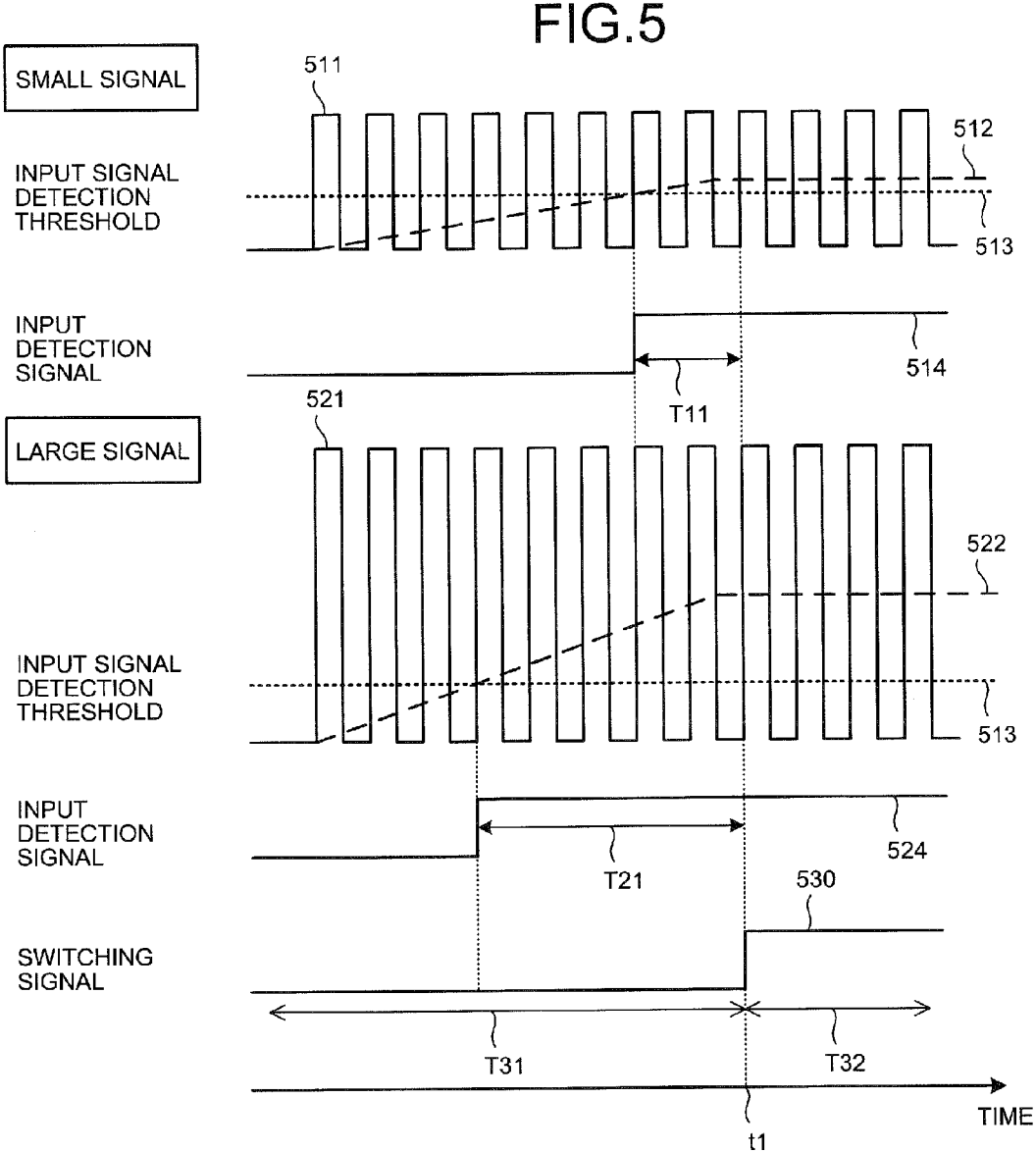

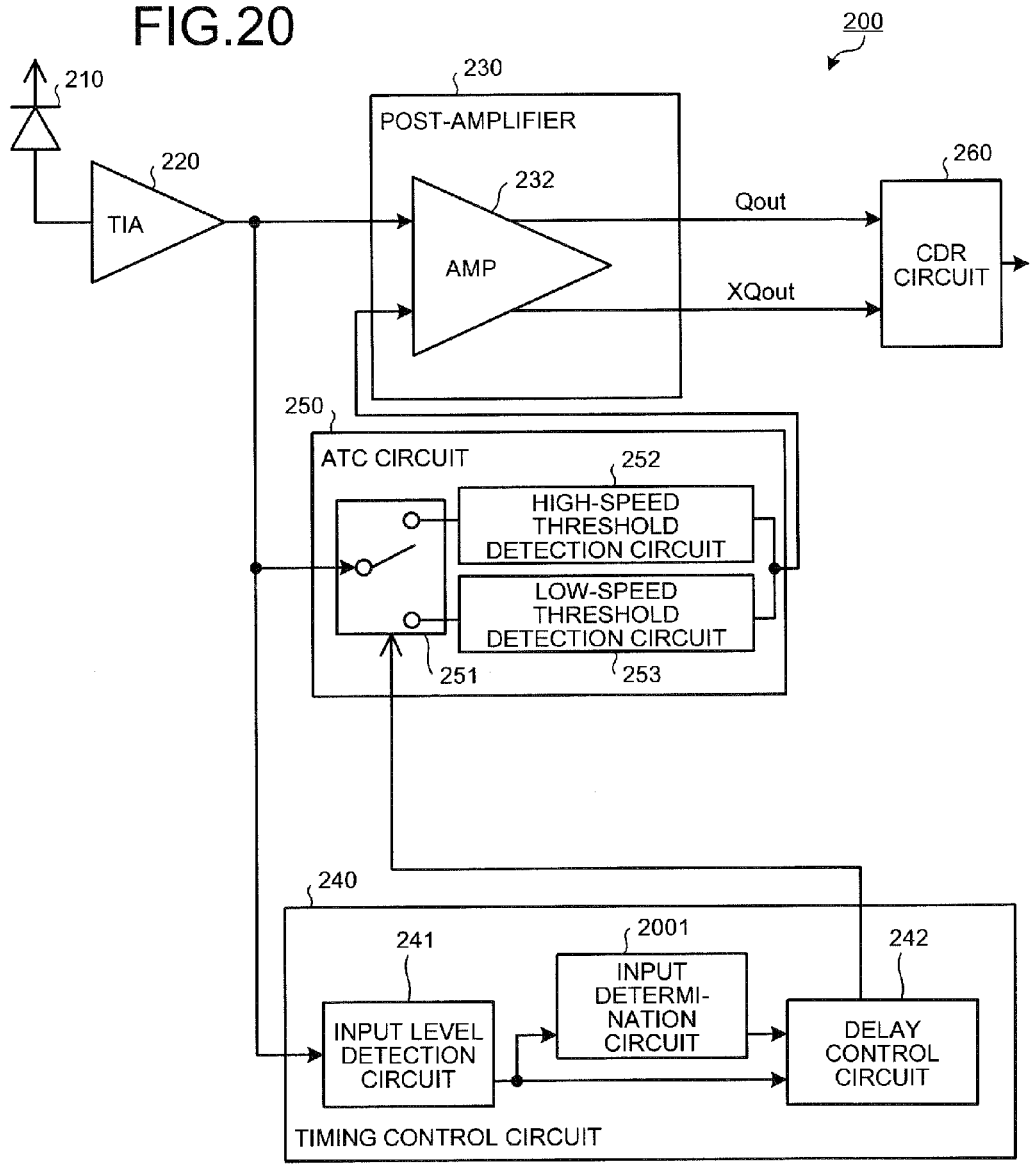

DETECTING APPARATUS, OPTICAL RECEIVING APPARATUS, DETECTING METHOD, AND OPTICAL RECEIVING METHOD

CROSS REFERENCE TO RELATED APPLICATIONS

This application is a continuation application of International Application PCT/JP2011/059749, filed on Apr. 20, 2011 and designating the U.S., the entire contents of which are incorporated herein by reference.

FIELD

The embodiments discussed herein are related to a detecting apparatus, an optical receiving apparatus, a detecting method, and an optical receiving method.

BACKGROUND

A passive optical network (PON) system is known that performs optical communication between an optical line terminal (OLT: switching station terminal) and an optical network unit (ONU: subscriber terminal) in an optical access system. In a PON, variation in the duty ratio (duty) of optical output of an optical transmitter on the ONU side and variation in the duty ratio generated in an optical transmitter on the OLT side occur.

These variations in duty ratio cause variation in the duty ratio of an input signal to burst mode clock data recovery (CDR) on the OLT side, resulting in a problem with interoperability arises in that the proper pulling-in of data becomes impossible. Particularly, if the speed is raised to 2.5 [Gbps] and 10 [Gbps] in XGPON etc., there is concern that the effects of these variations in duty ratio will increase.

On the other hand, automatic threshold control (ATC) is known technique of performing control by changing the threshold level that is used in detecting the level of an input signal to follow according to the magnitude of variation of the input signal. Average-detection-type ATC, which derives an average value as a threshold of signal, is known as a method capable of suppressing variation in duty ratio of signal output. A scheme of ATC is known for performing threshold detection at higher speeds (with a smaller time constant) at the time of input of a burst signal and subsequently switching to threshold detection at lower speeds (with a larger time constant) capable of withstanding a succession of the same codes (see, for example, Japanese Laid-Open Patent Publication Nos. 2009-177577 and 2008-312216).

SUMMARY

According to an aspect of an embodiment, a detecting apparatus includes a threshold detection circuit that detects by a switchable time constant, a threshold of a level of an input optical burst signal; an input detection circuit that detects input of the optical burst signal; a level detection circuit that detects a level of the optical burst signal; a switching circuit that switches the time constant when a period that corresponds to the level detected by the level detection circuit has elapsed after the input is detected by the input detection circuit; and an output circuit that outputs the threshold detected by the threshold detection circuit.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a diagram of an example of a configuration of a detecting apparatus according to a first embodiment;

FIG. 2 is a diagram of an example of a configuration of an optical receiving apparatus according to a second embodiment;

FIG. 3 is a diagram of an example of relations between input level and delay period;

FIG. 4A is a flowchart of an example of a time constant switching operation of the optical receiving apparatus;

FIG. 4B is a flowchart of an example of a time constant switching operation of the optical receiving apparatus;

FIG. 5 is a diagram of an example of operation timing of the optical receiving apparatus;

FIG. 20 is a diagram of an example of a configuration of the optical receiving apparatus according to a fourth embodiment.

DESCRIPTION OF EMBODIMENTS

Figure 6:
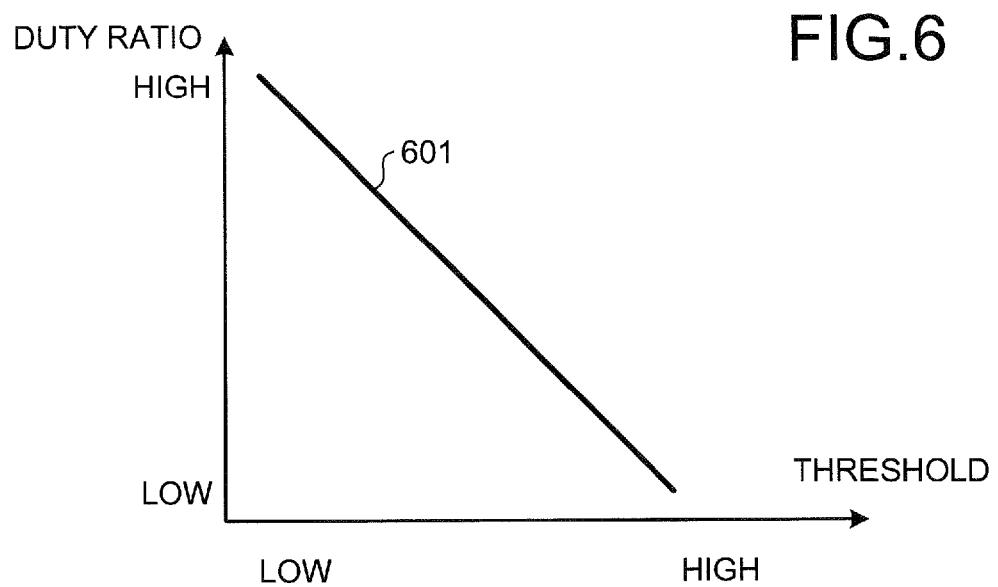
FIG. 6 is a diagram of an example of the relationship between variation in threshold and variation in duty ratio.

Embodiments of a detecting apparatus, an optical receiving apparatus, a detecting method and an optical receiving method will be described in detail with reference to the accompanying drawings.

FIG. 1 is a diagram of an example of a configuration of a detecting apparatus according to a first embodiment. As depicted in FIG. 1, a detecting apparatus 100 according to the first embodiment detects a threshold of a level of a burst reception signal. The detecting apparatus 100 includes an optoelectronic converter 110, a threshold detection circuit 120, an input detection circuit 130, a level detection circuit 140, a switching circuit 150, and an output circuit 160.

The optoelectronic converter 110 opto-electronically converts an optical burst signal input to the detecting apparatus 100. The optoelectronic converter 110 outputs to the threshold detection circuit 120, the input detection circuit 130, and the level detection circuit 140, a burst signal that has been converted into an electrical signal by optoelectronic conversion.

The threshold detection circuit 120 detects a threshold of the burst signal output from the optoelectronic converter 110. As a result, the threshold of the optical burst signal input to the detecting apparatus 100 can be detected. For example, the threshold detection circuit 120 detects an average value of the level of the burst signal as a threshold of the burst signal. The threshold detection circuit 120 outputs the detected threshold to the output circuit 160.

A time constant for detection of the threshold in the threshold detection circuit 120 may be switched by the switching circuit 150. For example, the time constant of the threshold detection circuit 120 may be switched to a first time constant (high speed) and a second time constant (low speed) that is greater than the first time constant.

The input detection circuit 130 detects input of the optical burst signal to the detecting apparatus 100 (i.e., determines the presence of input) based on the burst signal output from the optoelectronic converter 110. The input detection circuit 130 notifies the switching circuit 150 of a determination result. For example, the input detection circuit 130 includes a detecting unit that detects the level of the burst signal and determines that an optical burst signal has been input if the level detected by the detecting unit exceeds a threshold. In this case, the level detection circuit 140 may be used as the detecting unit that detects the level of the burst signal.

The level detection circuit 140 detects the level of the burst signal output from the optoelectronic converter 110. As a result, the level of the optical burst signal input to the detecting apparatus 100 can be detected. The level detection circuit 140 notifies the switching circuit 150 of the detected level.

The switching circuit 150 switches the time constant of the output circuit 160 based on the notification from the input detection circuit 130, when a predetermined period has elapsed since the input detection circuit 130 detected the input of the optical burst signal. The switching circuit 150 changes according the level reported by the level detection circuit 140, the predetermined period, which is from the detection of the input of the optical burst signal until the switching of the time constant of the output circuit 160. For example, when the reported level is higher, the switching circuit 150 extends the predetermined period, which is from the detection of the input of the optical burst signal until the switching of the time constant of the output circuit 160.

For example, the switching circuit 150 sets the time constant of the output circuit 160 to the first time constant (high speed) before the predetermined period has elapsed after the detection of the input of the optical burst signal. The switching circuit 150 switches the time constant of the output circuit 160 from the first time constant (high speed) to the second time constant (low speed) when the predetermined period has elapsed after the detection of the input of the optical burst signal. As a result, a threshold of a rising portion of the optical burst signal can be detected with the high-speed time constant and a threshold of a portion after the rising portion of the optical burst signal can be detected with the low-speed time constant.

The output circuit 160 outputs the threshold output from the threshold detection circuit 120. For example, the output circuit 160 outputs the threshold to a determination circuit that determines data indicated by the burst signal based on the threshold output by the output circuit 160 and the burst signal output from the optoelectronic converter 110.

In FIG. 1, the burst signal that has been opto-electronically converted by the optoelectronic converter 110 from the optical burst signal input to the detecting apparatus 100 is output to the threshold detection circuit 120, the input detection circuit 130, and the level detection circuit 140 in the described configuration; however, configuration is not limited hereto. For example, the detecting apparatus 100 may be configured such that the optical burst signal input to the detecting apparatus 100 is branched and output to the threshold detection circuit 120, the input detection circuit 130, and the level detection circuit 140. In this case, the optoelectronic converter 110 is disposed upstream from each of the threshold detection circuits 120, the input detection circuit 130, and the level detection circuit 140 to opto-electronically convert the optical burst signal.

As described, the detecting apparatus 100 according to the first embodiment changes according to the level of the burst signal (signal level), the period that is from the detection of the input of the burst signal (signal input) until the switching (e.g., reduction) of the time constant of the threshold detection. Since a delay period (delay rate) of detection of the input of the burst signal is changed by the level of the burst signal, the threshold can be restrained from varying due to a change in the delay period of detection of the input of the burst signal.

Thus, suppression of variation in duty ratio of a signal obtained by comparison between the burst signal and the threshold (e.g., differential amplification) is enabled. As a result, data indicated by the received optical burst signal is determined accurately, enabling reception quality to be improved.

FIG. 2 is a diagram of an example of a configuration of an optical receiving apparatus according to a second embodiment. An optical receiving apparatus 200 depicted in FIG. 2 is an optical receiving apparatus to which the detecting apparatus 100 depicted in FIG. 1 is applied. The optical receiving apparatus 200 receives an optical burst signal. The optical receiving apparatus 200 is applicable to a photoreceptor on the OLT side of the PON, for example. The optical receiving apparatus 200 includes a PD 210, a transimpedance amplifier (TIA) 220, a post-amplifier 230, a timing control circuit 240, an ATC circuit 250, and a CDR circuit 260.

The PD 210 opto-electronically converts an optical burst signal input to the optical receiving apparatus 200 and outputs to the TIA 220, a burst signal that has been converted into an electrical signal. The PD 210 is a PIN-PD or an avalanche PD, for example.

The TIA 220 converts and amplifies the bust signal output from the PD 210 into a voltage signal. The TIA 220 outputs the converted and amplified burst signal to the post-amplifier 230, the timing control circuit 240, and the ATC circuit 250.

The post-amplifier 230 is an equalizing amplifier circuit that equalizes and outputs the amplitude of the burst signal output from the TIA 220. For example, the post-amplifier 230 includes a signal detection circuit 231 and an amplifier 232. The signal detection circuit 231 detects input of the optical burst signal to the optical receiving apparatus 200, based on the burst signal output from the TIA 220.

For example, the signal detection circuit 231 includes a detecting unit that detects the level of the burst signal and determines that an optical burst signal has been input if the level detected by the detecting unit exceeds a threshold. Upon detecting the input of an optical burst signal, the signal detection circuit 231 outputs an input detection signal to the timing control circuit 240. For example, the input detection signal is a signal that rises when the input of the burst signal is detected and falls when the input of the burst signal is no longer detected.

The burst signal output from the TIA 220 and the threshold output from the ATC circuit 250 are input to the amplifier 232. The amplifier 232 is a differential amplifier circuit that performs differential amplification for amplifying the difference of the input burst signal and the threshold by a predetermined coefficient (differential gain). The amplifier 232 outputs to the CDR circuit 260, a normal signal Qout and an inverted signal XQout obtained by the differential amplification. The amplifier 232 may output any one among the normal signal Qout and the inverted signal XQout to the CDR circuit 260.

A detection speed of the signal detection circuit 231, i.e., a delay period after actual input of a burst signal until the detection of the input of the burst signal by the signal detection circuit 231, changes according to the level of the burst signal. For example, when the level of the burst signal is low, a longer time is required for the signal detection circuit 231 to detect the input of the burst signal.

The timing control circuit 240 includes an input level detection circuit 241 and a delay control circuit 242. The input level detection circuit 241 detects the input level of the burst signal output from the TIA 220. The input level detection circuit 241 outputs a level detection signal indicative of the detected input level to the delay control circuit 242.

The delay control circuit 242 controls the delay amount of the timing at which the time constant of the ATC circuit 250 is switched, based on the input detection signal output from the post-amplifier 230 and the level detection signal output from the input level detection circuit 241. For example, when a predetermined period has elapsed after the output of the input detection signal from the post-amplifier 230, the delay control circuit 242 outputs to the ATC circuit 250, a switching signal that instructs switching from a high-speed time constant to a low-speed time constant. When the level detection signal output from the input level detection circuit 241 indicates a higher level, the delay control circuit 242 extends the time after the output of the input detection signal from the post-amplifier 230 until the output of the switching signal.

The ATC circuit 250 performs ATC (automatic threshold adjustment) by changing the threshold for detecting the signal level at the post-amplifier 230 to follow according to the variation of the level of the burst signal output from the TIA 220. For example, the ATC circuit 250 detects a threshold of the burst signal output from the TIA 220 and outputs the detected threshold to the post-amplifier 230.

The ATC circuit 250 is an average-detection-type ATC circuit that detects a threshold of a burst signal by calculating an average value of the burst signal. The ATC circuit 250 can switch the time constant for detection of the threshold of the burst signal. A configuration of the ATC circuit 250 will be described. The ATC circuit 250 includes an analogue switch 251, a high-speed threshold detection circuit 252, and a low-speed threshold detection circuit 253.

The burst signal output from the TIA 220 is input to the analogue switch 251. The analogue switch 251 is a path switch capable of switching between a path for outputting the input burst signal to the high-speed threshold detection circuit 252 and a path for outputting the input burst signal to the low-speed threshold detection circuit 253. The analogue switch 251 switches the path based on the switching signal output from the timing control circuit 240.

The high-speed threshold detection circuit 252 detects by a time constant (first time constant) that is less than the low-speed threshold detection circuit 253, the threshold of the burst signal output from the analogue switch 251. For example, the high-speed threshold detection circuit 252 detects an average value of the level of the burst signal by a time constant that is less than the low-speed threshold detection circuit 253. The high-speed threshold detection circuit 252 outputs the detected threshold to the post-amplifier 230.

The low-speed threshold detection circuit 253 detects by a time constant (second time constant) that is greater than the high-speed threshold detection circuit 252, the threshold of the burst signal output from the analogue switch 251. For example, the low-speed threshold detection circuit 253 detects an average value of the level of the burst signal using a time constant that is greater than the high-speed threshold detection circuit 252. The low-speed threshold detection circuit 253 outputs the detected threshold to the post-amplifier 230.

The time constant in the low-speed threshold detection circuit 253 is set to a time constant capable of withstanding a succession of the same codes greater than or equal to the 72 [bits] specified by the International Telecommunication Union-Telecommunication sector (ITU-T), for example.

The CDR circuit 260 extracts a clock from among signals output from the post-amplifier 230 (e.g., the normal signal Qout and the inverted signal XQout) to determine data indicated by the optical burst signal input to the optical receiving apparatus 200. For example, the CDR circuit 260 converts the signal output from the post-amplifier 230 into digital signals to perform waveform shaping (reshaping), timing recovery (retiming), identification and reproduction (regenerating), etc. of the converted signals. The CDR circuit 260 outputs the data that has been determined.

The amplifier 232 and the CDR circuit 260 make up a determination circuit that determine data indicated by the burst signal, based on the threshold detected by the ATC circuit 250. The CDR circuit 260 is an output circuit that outputs the determined data.

The optoelectronic converter 110 depicted in FIG. 1 may be implemented by the PD 210 and the TIA 220, for example. The threshold detection circuit 120 and the output circuit 160 depicted in FIG. 1 may be implemented by the ATC circuit 250, for example. The input detection circuit 130 depicted in FIG. 1 may be implemented by the signal detection circuit 231, for example. The level detection circuit 140 depicted in FIG. 1 may be implemented by the input level detection circuit 241, for example. The switching circuit 150 depicted in FIG. 1 may be implemented by the delay control circuit 242, for example. The amplifier 232 and the CDR circuit 260 may be disposed external to the optical receiving apparatus 200 and the optical receiving apparatus 200 may be configured as a detecting apparatus for a threshold.

FIG. 3 is a diagram of an example of relations between input level and delay period. In FIG. 3, the horizontal axis indicates delay period of input detection of the burst signal by the signal detection circuit 231 after the input of the burst signal to the signal detection circuit 231. The horizontal axis also indicates the delay period after the output of the input detection signal from the signal detection circuit 231 until the delay control circuit 242 outputs a switching signal. The vertical axis indicates the input level of the burst signal detected by the input level detection circuit 241.

A curve 301 represents relationship between the input level of the burst signal and the delay period of input detection of the burst signal by the signal detection circuit 231. As indicated by the curve 301, when the input level of the burst signal is lower, the delay period of input detection of the burst signal by the signal detection circuit 231 is longer.

A curve 302 represents relations between the input level of the burst signal and the delay period until the delay control circuit 242 outputs a switching signal. As indicated by the curve 302, when the input level of the burst signal is lower, the delay control circuit 242 reduces the delay period until the output of the switching signal. As a result, when the delay period of input detection of the burst signal by the signal detection circuit 231 is longer, the delay period until the output of the switching signal can be made shorter.

Therefore, even if the input level of the burst signal varies and the delay period of input detection of the burst signal by the signal detection circuit 231 is changed, variation in the timing of the switching of the time constant of the ATC circuit 250 can be reduced. Thus, the threshold can be restrained from varying consequent to a change in the delay period or detection of the input of a burst signal by the signal detection circuit 231.

By using the threshold restrained from varying, the duty ratio of signals output from the amplifier 232 can be suppressed. Therefore, data can be accurately determined by the CDR circuit 260 to improve reception quality.

FIG. 4A is a flowchart of an example of a time constant switching operation of the optical receiving apparatus. The optical receiving apparatus 200 depicted in FIG. 2 operates as indicated by the steps in FIG. 4A for the time constant switching operation, for example. The delay control circuit 242 outputs a switching signal to the analogue switch 251 to set to a high-speed time constant, the time constant for detection of the threshold at the ATC circuit 250 (step S411). At step S411, for example, the path of the analogue switch 251 is switched to the path connected to the high-speed threshold detection circuit 252, thereby setting the high-speed time constant.

The input level detection circuit 241 starts detection of the input level of the burst signal (step S412). The delay control circuit 242 derives the switching timing of the time constant (step S413). The delay control circuit 242 waits until the switching timing derived at step S413 (step S414).

Before the switching timing, the threshold output from the high-speed threshold detection circuit 252 sufficiently rises and stabilizes. At the switching timing, the delay control circuit 242 outputs a switching signal to the analogue switch 251 to set to a low-speed time constant, the time constant for detection of the threshold in the ATC circuit 250 (step S415), and terminates a sequence of the switching operation.

FIG. 4B is a flowchart of an example of a time constant switching operation of the optical receiving apparatus. The optical receiving apparatus 200 depicted in FIG. 2 operates as indicated by the steps in FIG. 4B for the time constant switching operation, for example. The delay control circuit 242 outputs a switching signal to the analogue switch 251 to set to a high-speed time constant, the time constant for detection of the threshold in the ATC circuit 250 (step S421). At step S421, for example, the path of the analogue switch 251 is switched to the path connected to the high-speed threshold detection circuit 252, thereby setting the high-speed time constant.

The input level detection circuit 241 starts detection of the input level of the burst signal (step S422). When the signal detection circuit 231 detects input of the burst signal (step S423), the delay control circuit 242 derives the delay period corresponding to the input level detected by the input level detection circuit 241 (step S424).

The delay control circuit 242 derives the switching timing of the time constant, based on the delay period derived at step S424 (step S425). At step S425, for example, the delay control circuit 242 derives as the switching timing, a time point at which the delay period elapses from the current time point. The delay control circuit 242 waits until the switching timing derived at step S425 (step S426).

Before the switching timing, the threshold output from the high-speed threshold detection circuit 252 sufficiently rises and stabilizes. At the switching timing, the delay control circuit 242 outputs a switching signal to the analogue switch 251 to set the time constant for detection of the threshold in the ATC circuit 250 to a low-speed time constant (step S427), and terminates a sequence of the switching operation. At step S427, for example, the path of the analogue switch 251 is switched to the path connected to the low-speed threshold detection circuit 253, thereby setting the low-speed time constant.

FIG. 5 is a diagram of an example of the operation timing of the optical receiving apparatus. In FIG. 5, the horizontal axis indicates time. The vertical direction indicates the level of each signal. A burst signal 511 indicates a burst signal of relatively low level (small signal) output from the TIA 220. A burst signal 521 indicates a burst signal of relatively high level (large signal) output from the TIA 220. It is assumed that the burst signals 511 and 521 are alternating signals of "1010 . . . ".

A detection level 512 indicates the level of the burst signal 511 detected by the signal detection circuit 231 in the case of the burst signal 511 being input. An input signal detection threshold 513 indicates the threshold set by the signal detection circuit 231. An input detection signal 514 indicates the input detection signal output by the signal detection circuit 231 in the case of the burst signal 511 being input. If the detection level 512 exceeds the input signal detection threshold 513, the input detection signal 514 is output (changed from low to high) by the signal detection circuit 231.

A detection level 522 indicates the level of the burst signal 521 detected by the signal detection circuit 231 in the case of the burst signal 521 being input. An input detection signal 524 indicates the input detection signal output by the signal detection circuit 231 in the case of the burst signal 521 being input. If the detection level 522 exceeds the input signal detection threshold 513, the input detection signal 524 is output (changed from low to high) by the signal detection circuit 231.

A switching signal 530 indicates a switching signal output by the delay control circuit 242. If the switching signal 530 is not output (becomes low), the analog switch 251 is assumed to be switched to the path to the high-speed threshold detection circuit 252. If the switching signal 530 is output (becomes high), the analog switch 251 is assumed to be switched to the path to the low-speed threshold detection circuit 253.

If the burst signal 511 is output from the TIA 220, the switching signal 530 is not output (is set low) by the delay control circuit 242 during an interval T31 until time t1 at which a delay period T11 has elapsed after the input detection signal 514 is output (becomes high). The switching signal 530 is output (is set high) by the delay control circuit 242 during an interval T32 after time t1.

If the burst signal 521 is output from the TIA 220, the switching signal 530 is not output (is set low) by the delay control circuit 242 during an interval T31 until time t1 at which a delay period T21 has elapsed after the input detection signal 524 is output (becomes high). The switching signal 530 is output (is set high) by the delay control circuit 242 during the interval T32 after time t1.

As described above, the delay period T21 corresponding to the input of the burst signal 521 (large signal) is set to be longer than the delay period T11 in the case of input of the burst signal 511 (small signal). As a result, the time points of output of the switching signal 530 by the delay control circuit 242 can be made to coincide (at time point t1) in the respective cases of the burst signals 511 and 521. Therefore, the switching timing of the time constant of the ATC circuit 250 can be restrained from varying due to a change in the level of the input burst signal.

For example, by shortening the delay period T11 in the case of input of the burst signal 511 (small signal), the time constant of the ATC circuit 250 can be prevented from remaining at a high speed after the output of the ATC circuit 250 (high-speed threshold detection circuit output) rises and stabilizes. Therefore, the threshold can be restrained from varying due to a succession of the same codes and the duty ratio can be prevented from varying.

By extending the delay period T21 in the case of input of the burst signal 521 (large signal), the time constant of the ATC circuit 250 can be prevented from switching to a low speed before the output of the ATC circuit 250 (high-speed threshold detection circuit output) rises and stabilizes. Therefore, the threshold can be prevented from remaining low and making the duty ratio high.

Although the time points of output of the switching signal 530 by the delay control circuit 242 are made to coincide in the respective cases of the burst signals 511 and 521 in this description, the time points may not completely coincide. In other words, after the output of the ATC circuit 250 (high-speed threshold detection circuit output) rises and stabilizes, the time constant of the ATC circuit 250 may be switched from the high-speed time constant to the low-speed time constant. By making the delay period of the switching signal shorter when the level of the input burst signal larger, a difference of the time points at which the switching signal 530 is output by the delay control circuit 242 can be reduced between the respective cases of the burst signals 511 and 521. Therefore, the switching timing of the time constant of the ATC circuit 250 can be restrained from varying due to a change in level of the input burst signal.

FIG. 6 is a diagram of an example of the relationship between variation in threshold and variation in duty ratio. In FIG. 6, the horizontal axis indicates the threshold output from the ATC circuit 250. The vertical axis indicates the duty ratio of the signal output from the amplifier 232. Curve 601 represents the relationship between the threshold output from the ATC circuit 250 and the duty ratio of the signal output from the amplifier 232. As indicated by the curve 601, when the threshold output from the ATC circuit 250 is higher, the duty ratio of the signal output from the amplifier 232 is lower (in the case of the normal signal Qout).

Figure 7:
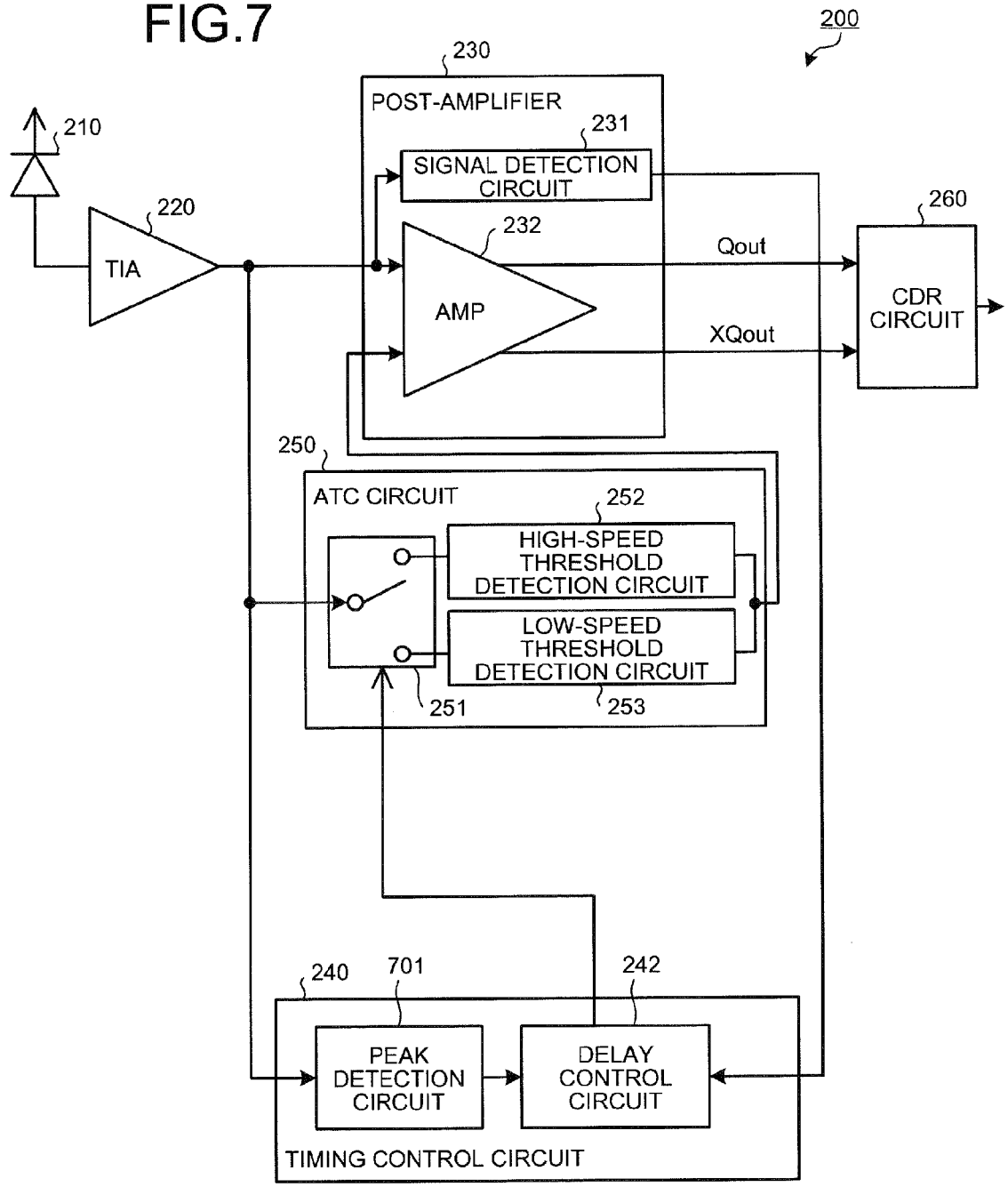
FIG. 7 is a diagram of a first specific example of an input level detection circuit.

FIG. 7 is a diagram of a first specific example of the input level detection circuit. In FIG. 7, portions identical to the portions depicted in FIG. 2 are denoted by the same reference numerals used in FIG. 2 and will not be described. As depicted in FIG. 7, the input level detection circuit 241 depicted in FIG. 2 may be implemented by a peak detection circuit 701, for example. The peak detection circuit 701 detects a peak level of amplitude of the burst signal output from the TIA 220. The peak detection circuit 701 outputs a level detection signal indicative of the detected peak level to the delay control circuit 242. The peak detection circuit 701 may be implemented by using an operational amplifier, a diode, and a capacitor, for example.

Figure 8:
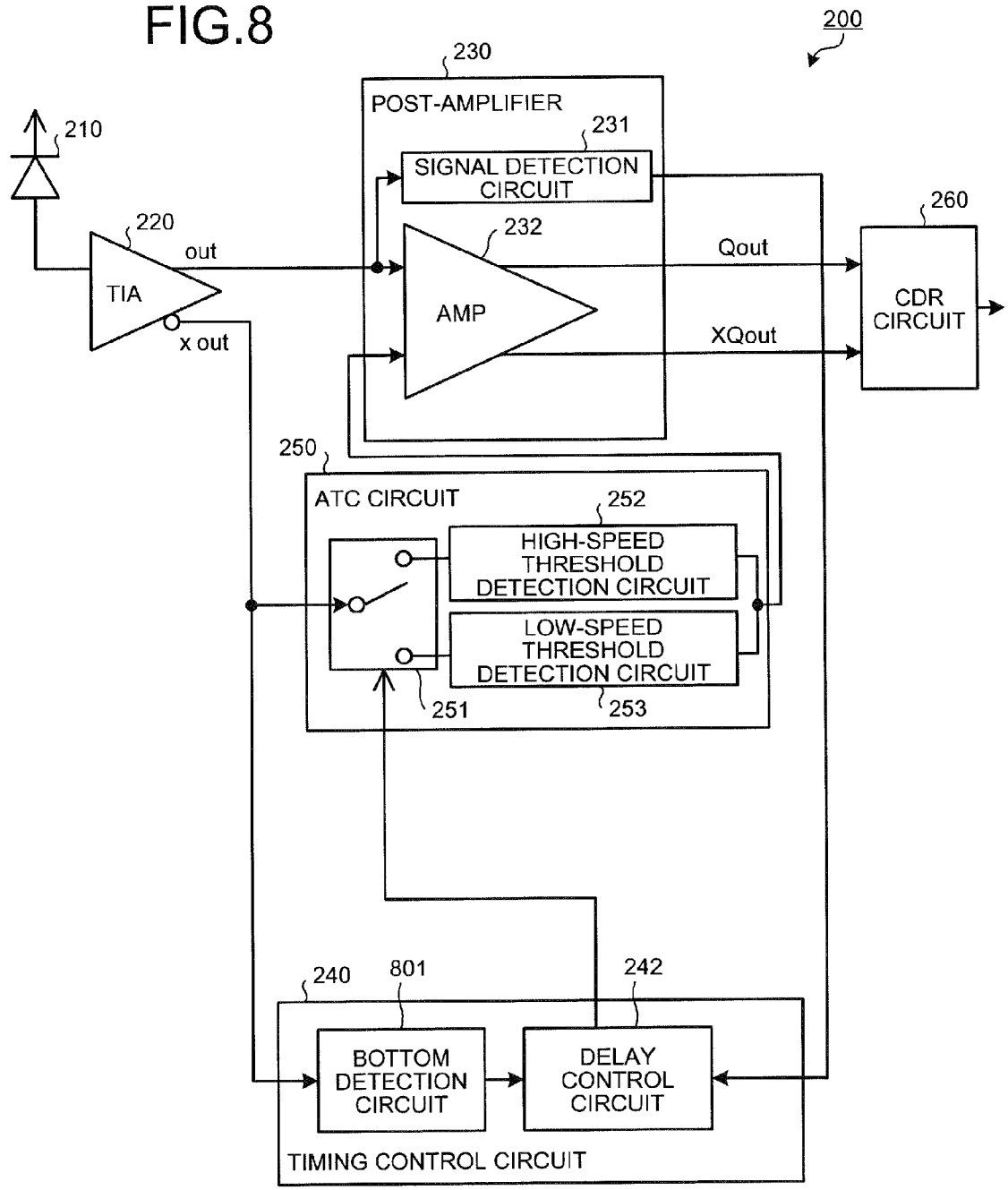
FIG. 8 is a diagram of a second specific example of the input level detection circuit.

FIG. 8 is a diagram of a second specific example of the input level detection circuit. In FIG. 8, portions identical to the portions depicted in FIG. 2 are denoted by the same reference numerals used in FIG. 2 and will not be described. As depicted in FIG. 8, the input level detection circuit 241 depicted in FIG. 2 may be implemented by a bottom detection circuit 801, for example. It is assumed that the TIA 220 outputs as a normal burst signal out and inversion burst signal xout, the burst signal that is converted into the electrical signal. The normal burst signal out is output to the post-amplifier 230. The inversion burst signal xout is output to the timing control circuit 240 and the ATC circuit 250.

The bottom detection circuit 801 detects a bottom level of amplitude of the inversion burst signal xout output from the TIA 220. The bottom detection circuit 801 outputs a level detection signal that indicates the detected bottom level to the delay control circuit 242. The bottom detection circuit 801 may be implemented by using an operational amplifier, a diode, and a capacitor, for example.

Figure 9:
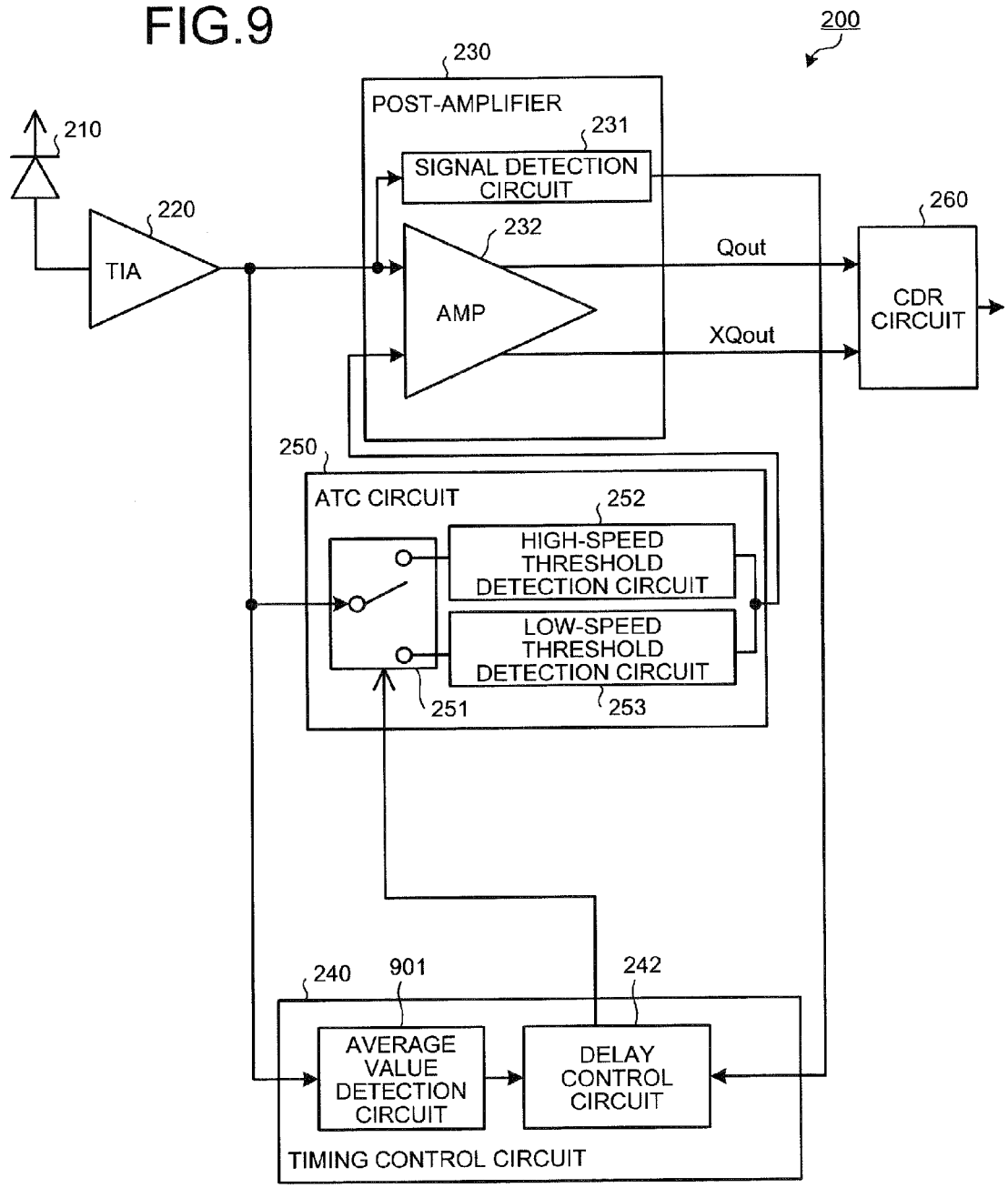
FIG. 9 is a diagram of a third specific example of the input level detection circuit.

FIG. 9 is a diagram of a third specific example of the input level detection circuit. In FIG. 9, portions identical to the portions depicted in FIG. 2 are denoted by the same reference numerals used in FIG. 2 and will not be described. As depicted in FIG. 9, the input level detection circuit 241 depicted in FIG. 2 may be implemented by an average value detection circuit 901, for example. The average value detection circuit 901 detects an average value of amplitude (level) of the burst signal output from the TIA 220. The average value detection circuit 901 outputs a level detection signal indicative of the detected average value to the delay control circuit 242. The average value detection circuit 901 may be implemented by a resistor-capacitor circuit (RC circuit) using a resistor and a capacitor, for example.

Figure 10:
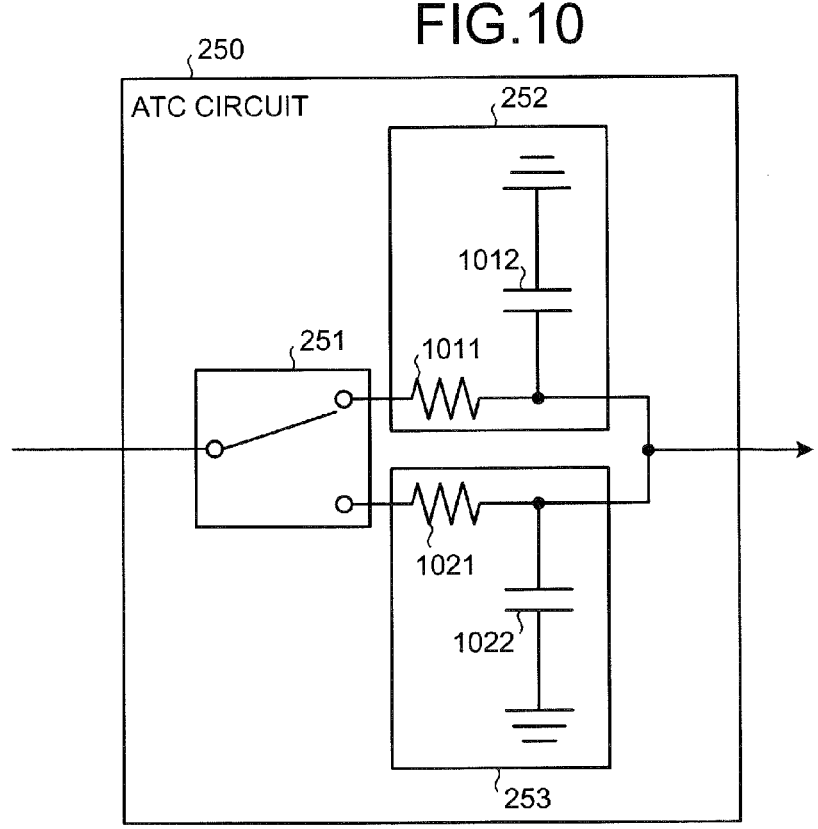
FIG. 10 is a diagram of an example of a configuration of an ATC circuit.

FIG. 10 is a diagram of an example of a configuration of the ATC circuit. As depicted in FIG. 10, the high-speed threshold detection circuit 252 of the ATC circuit 250 may be implemented by an integrator circuit (RC circuit) that includes a resistor 1011 and a capacitor 1012, for example. The resistor 1011 is connected at one end to the analogue switch 251 and is connected at the other end to the capacitor 1012 and an output unit of the ATC circuit 250. The capacitor 1012 is connected at one end to the resistor 1011 and the output unit of the ATC circuit 250 and is grounded at the other end.

The low-speed threshold detection circuit 253 may be implemented by an integrator circuit (RC circuit) that includes a resistor 1021 and a capacitor 1022, for example. The resistor 1021 is connected at one end to the analogue switch 251 and is connected at the other end to the capacitor 1022 and the output unit of the ATC circuit 250. The capacitor 1022 is connected at one end to the resistor 1021 and the output unit of the ATC circuit 250 and is grounded at the other end.

The time constant of the high-speed threshold detection circuit 252 may be set according to a resistance value of the resistor 1011 and a capacitance value of the capacitor 1012. The time constant of the low-speed threshold detection circuit 253 may be set according to a resistance value of the resistor 1021 and a capacitance value of the capacitor 1022. For example, the resistance value of the resistor 1011 may be set to be lower than the resistance value of the resistor 1021 to make the time constant of the high-speed threshold detection circuit 252 less than the time constant of the low-speed threshold detection circuit 253.

As described above, the ATC circuit 250 (the threshold detection circuit 120) may be implemented by an integrator circuit (the analogue switch 251, the resistors 1011, 1021, and the capacitors 1012, 1022) that integrates the level of the burst signal by the switchable time constant.

Figure 11:
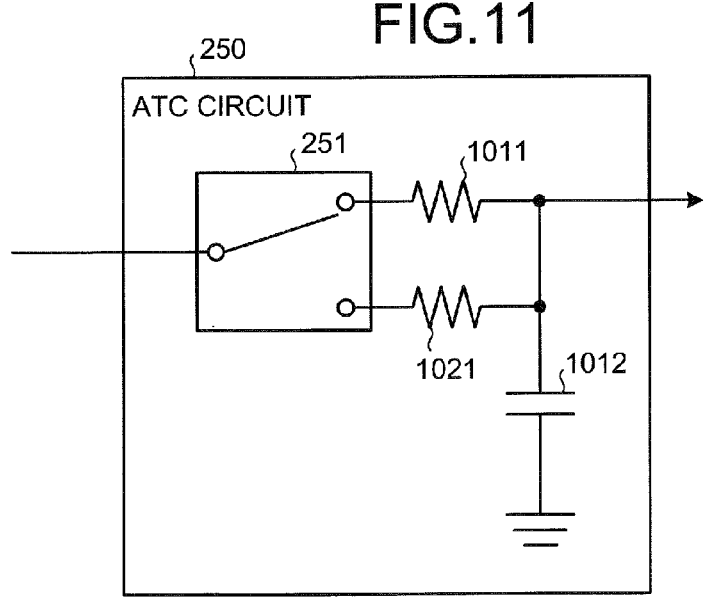
FIG. 11 is a diagram of a variation of the ATC circuit.

FIG. 11 is a diagram of a variation of the ATC circuit. In FIG. 11, portions identical to the portions depicted in FIG. 10 are denoted by the same reference numerals used in FIG. 10 and will not be described. As depicted in FIG. 11, the ATC circuit 250 may be implemented by the analogue switch 251, the resistors 1011, 1021, and the capacitor 1012.

The resistor 1011 is connected at one end to the analogue switch 251 and is connected at the other end to the capacitor 1012 and the output unit of the ATC circuit 250. The resistor 1021 is connected at one end to the analogue switch 251 and is connected at the other end to the capacitor 1012 and the output unit of the ATC circuit 250. The capacitor 1012 is connected at one end to the resistors 1011, 1021, and the output unit of the ATC circuit 250 and is grounded at the other end.

For example, the resistance value of the resistor 1011 is set to be lower than the resistance value of the resistor 1021. In this case, when the path of the analogue switch 251 is connected to the resistor 1011, the time constant of the ATC circuit 250 is smaller as compared to when the path of the analogue switch 251 is connected to the resistor 1021. Therefore, as is the case with the ATC circuit 250 depicted in FIG. 10, the time constant of the ATC circuit 250 may be switched by switching the analogue switch 251. This enables a configuration without the capacitor 1022 depicted in FIG. 10.

As described above, the ATC circuit 250 (the threshold detection circuit 120) may be implemented by an integrator circuit (the analogue switch 251, the resistors 1011, 1021, and the capacitor 1012) that integrates the level of the burst signal by the switchable time constant.

Figure 12:
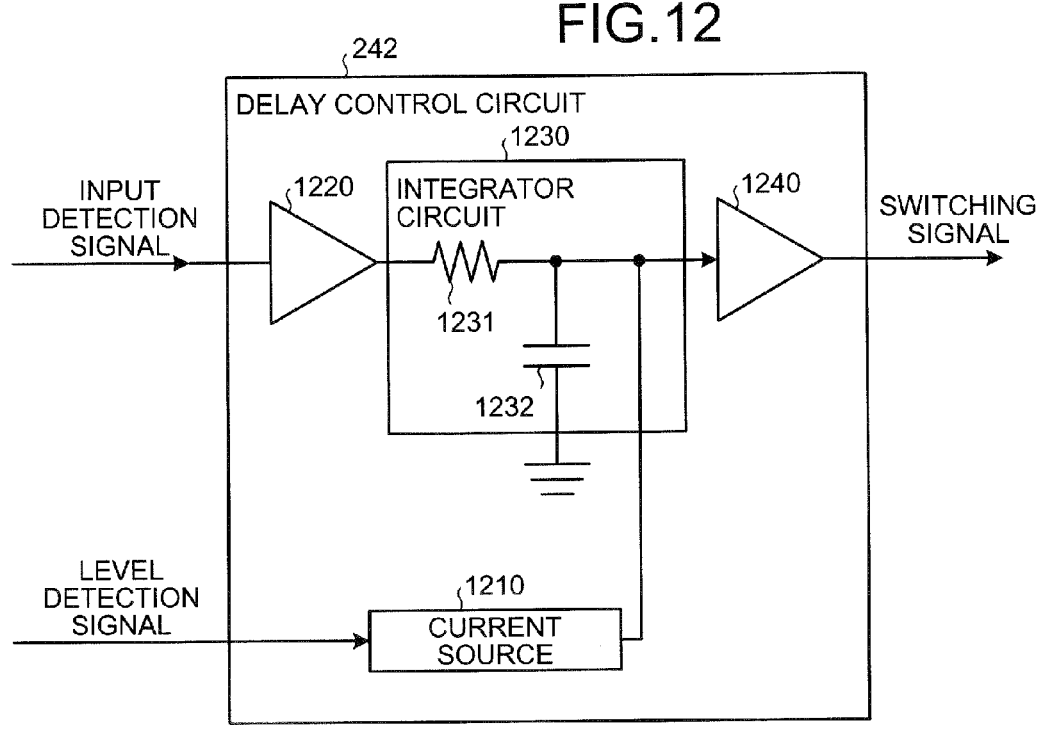
FIG. 12 is a diagram of an example of a configuration of a delay control circuit.

FIG. 12 is a diagram of an example of a configuration of the delay control circuit. For example, as depicted in FIG. 12, the delay control circuit 242 includes a current source 1210, a buffer 1220, an integrator circuit 1230, and a Schmitt trigger buffer 1240. The current source 1210 outputs to the integrator circuit 1230, control current that corresponds to the level detection signal output from the input level detection circuit 241. The input detection signal output by the signal detection circuit 231 is input to the buffer 1220. The buffer 1220 outputs the input detection signal to the integrator circuit 1230 after a delay of a certain period.

The integrator circuit 1230 outputs to the Schmitt trigger buffer 1240 after a delay of a time corresponding to the control current output from the current source 1210, the input detection signal output from the buffer 1220. The integrator circuit 1230 is implemented by an RC circuit that includes a resistor 1231 and a capacitor 1232. The resistor 1231 is connected at one end to the buffer 1220 and is connected at the other end to the capacitor 1232, the current source 1210, and the Schmitt trigger buffer 1240. The capacitor 1232 is connected at one end to the resistor 1231, the current source 1210, and the Schmitt trigger buffer 1240 and is grounded at the other end.

The Schmitt trigger buffer 1240 shapes the signal output from the integrator circuit 1230 and outputs the shaped signal as a switching signal to the ATC circuit 250. For example, the Schmitt trigger buffer 1240 has a first threshold and a second threshold (the first threshold>the second threshold) as signal thresholds and causes the output signal to rise when the signal level exceeds the first threshold and causes the output signal to fall when the signal level falls below the second threshold.

As described above, the delay control circuit 242 (the switching circuit 150) may be implemented by the integrator circuit 1230 that integrates the input detection signal by the time constant that is switchable according to the level detected by the input level detection circuit 241 (the level detection circuit 140). For example, the delay control circuit 242 may be implemented by the current source 1210 and the integrator circuit 1230. The current source 1210 outputs a control current that corresponds to the level detected by the input level detection circuit 241. The integrator circuit 1230 integrates the input detection signal by the time constant changed according to the control current output by the current source 1210.

Figure 13:
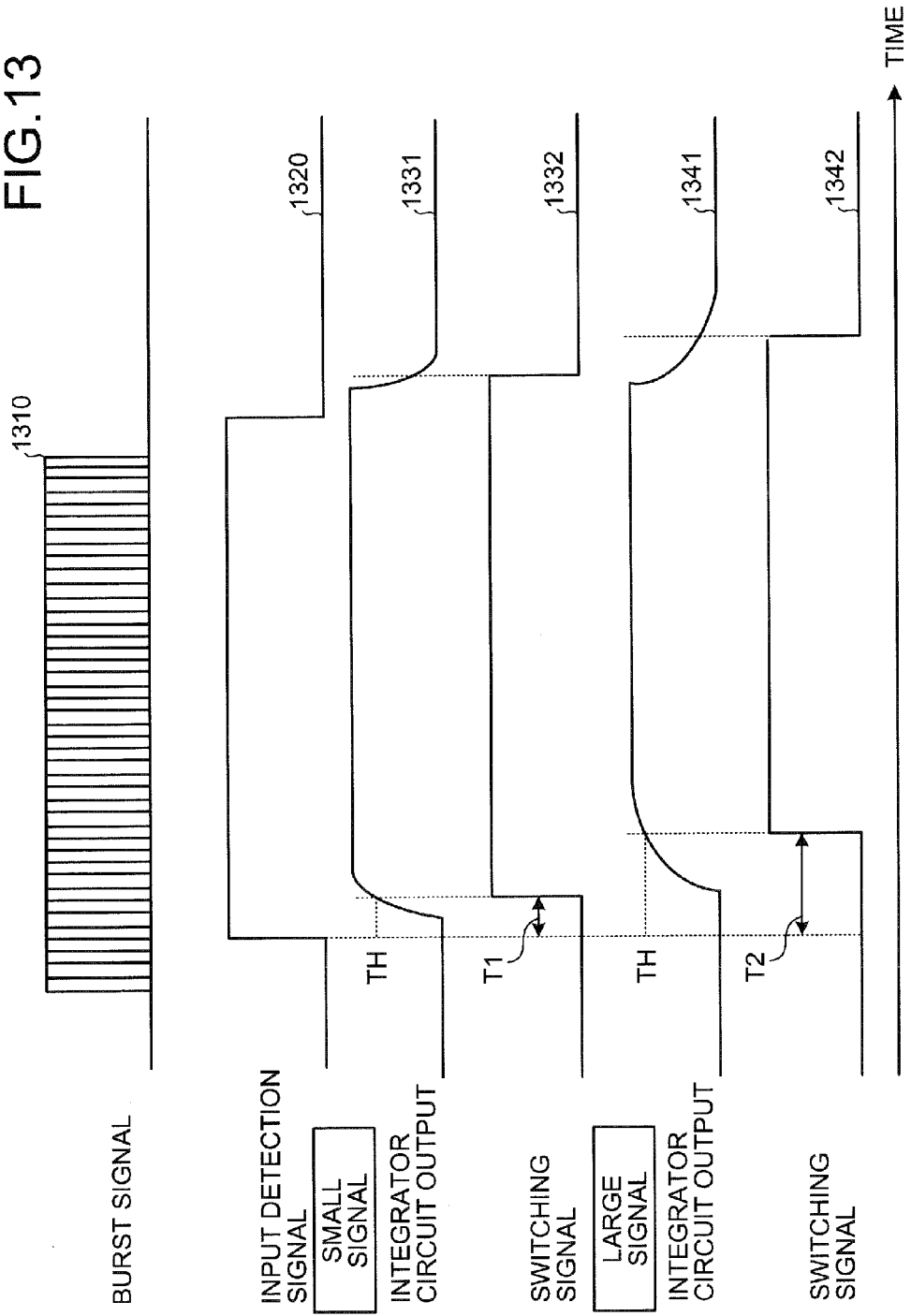
FIG. 13 is a diagram of an example of signals in the delay control circuit.

FIG. 13 is a diagram of an example of signals in the delay control circuit. In FIG. 13, the horizontal axis indicates time. The vertical direction indicates the level of each signal. A burst signal 1310 indicates a burst signal output from the TIA 220. In FIG. 13, signals in the delay control circuit 242 depicted in FIG. 12 will be described.

An input detection signal 1320 indicates the input detection signal output from the signal detection circuit 231. The input detection signal 1320 indicates that the input of the burst signal is not detected in the case of low and indicates that the input of the burst signal is detected in the case of high.

An integrator circuit output 1331 indicates a signal output from the integrator circuit 1230 when the level of the burst signal 1310 is relatively low (small signal). A switching signal 1332 indicates a switching signal output from the Schmitt trigger buffer 1240 when the level of the burst signal 1310 is relatively low (small signal). As indicated by the integrator circuit output 1331 and the switching signal 1332, when the integrator circuit output 1331 exceeds a threshold TH, the Schmitt trigger buffer 1240 switches the switching signal 1332 from low to high.

An integrator circuit output 1341 indicates a signal output from the integrator circuit 1230 when the level of the burst signal 1310 is relatively high (large signal). A switching signal 1342 indicates a switching signal output from the Schmitt trigger buffer 1240 when the level of the burst signal 1310 is relatively high (large signal). As indicated by the integrator circuit output 1341 and the switching signal 1342, when the integrator circuit output 1341 exceeds the threshold TH, the Schmitt trigger buffer 1240 switches the switching signal 1342 from low to high.

A delay period of a rise of the switching signal 1332 relative to a rise (switch form low to high) of the input detection signal 1320 is assumed to be a delay period T1. A delay period of a rise of the switching signal 1342 relative to a rise of the input detection signal 1320 is assumed to be a delay period T2. When the level of the burst signal 1310 is relatively high, the control current from the current source 1210 becomes larger as compared to when the level of the burst signal 1310 is relatively small and therefore, the integrator circuit output 1341 rises later than the integrator circuit output 1331.

As a result, the delay period T2 of the switching signal 1342 becomes longer than the delay period T1 of the switching signal 1332. Thus, when the level of the burst signal 1310 is relatively high, the delay period after output of the input detection signal 1320 until output of the switching signal to the ATC circuit 250 can be made longer as compared to when the level of the burst signal 1310 is relatively low.

As indicated by the integrator circuit output 1331 and the switching signal 1332, when the integrator circuit output 1331 falls below a threshold lower than the threshold TH, the Schmitt trigger buffer 1240 switches the switching signal 1332 from high to low. As indicated by the integrator circuit output 1341 and the switching signal 1342, when the integrator circuit output 1341 falls below the threshold lower than the threshold TH, the Schmitt trigger buffer 1240 switches the switching signal 1342 from high to low.

Figure 14:
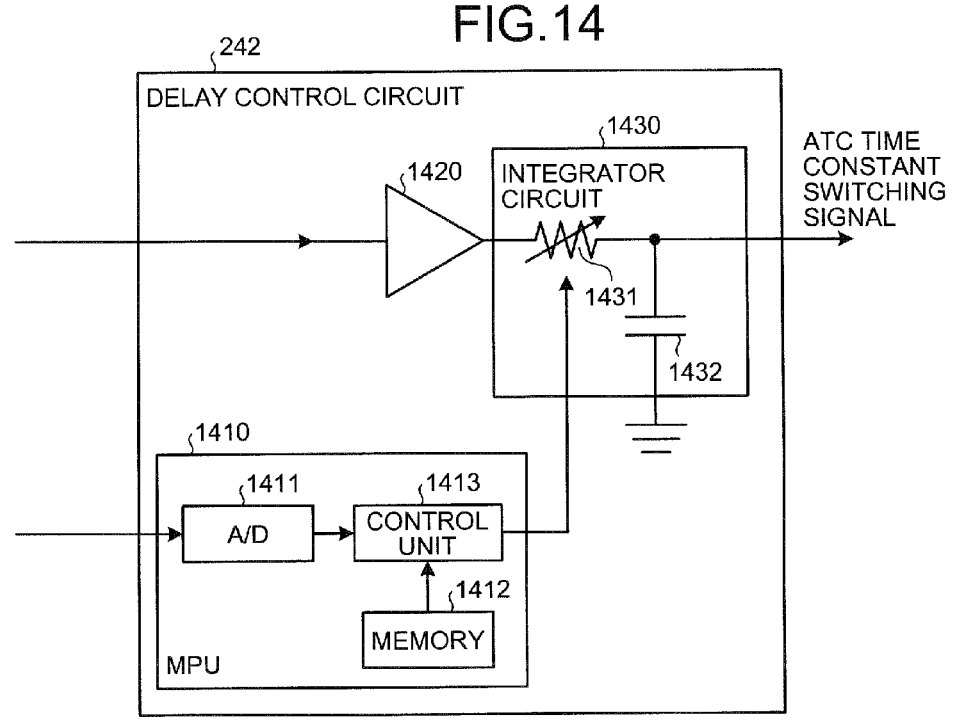
FIG. 14 is a diagram of another example of a configuration of the delay control circuit.

FIG. 14 is a diagram of another example of a configuration of the delay control circuit. For example, as depicted in FIG. 14, the delay control circuit 242 includes a micro processing unit (MPU) 1410, a buffer 1420, and an integrator circuit 1430. The MPU 1410 controls the time constant of the integrator circuit 1430 according to the level detection signal output from the input level detection circuit 241.

For example, the MPU 1410 includes a digital converter 1411, memory 1412, and a control unit 1413. The digital converter 1411 (A/D: analog/digital) converts the level detection signal output from the input level detection circuit 241 into a digital signal. The digital converter 1411 outputs the level detection signal converted into the digital signal to the control unit 1413.

The memory 1412 stores correlation information between a level indicated by the level detection signal and a resistance value of a variable resistor 1431 of the integrator circuit 1430. For example, the correlation information is a table correlating the level indicated by the level detection signal and the resistance value of the variable resistor 1431. Alternatively, the correlation information may be an equation for calculating the resistance value of the variable resistor 1431 based on the level indicated by the level detection signal.

The control unit 1413 acquires a resistance value corresponding to the level indicated by the level detection signal output from the digital converter 1411, based on the correlation information stored in the memory 1412 and controls the variable resistor 1431 such that the acquired resistance value is achieved. The input detection signal output by the signal detection circuit 231 is input to the buffer 1420. The buffer 1420 outputs the input detection signal to the integrator circuit 1430 after a delay of a certain period.

The integrator circuit 1430 induces delay to and outputs to the delay control circuit 242 downstream, the input detection signal output from the buffer 1420. The delay period of the input detection signal in the integrator circuit 1430 is controlled by the MPU 1410. For example, the integrator circuit 1430 is implemented by an RC circuit that includes the variable resistor 1431 and a capacitor 1432.

The variable resistor 1431 is connected at one end to the buffer 1420 and is connected at the other end to the capacitor 1432 and an output unit of the delay control circuit 242. The resistance value of the variable resistor 1431 is a digital variable resistance controlled by the MPU 1410. The capacitor 1432 is connected at one end to the variable resistor 1431 and the output unit of the delay control circuit 242 and is grounded at the other end. The signal output from an output unit of the integrator circuit 1430 is output as a switching signal to the ATC circuit 250.

In the correlation information of the memory 1412, for example, a higher level is correlated with a larger resistance value. As a result, when the level of the burst signal is higher, the time constant of the integrator circuit 1430 is larger. Therefore, when the level of the burst signal is relatively high, the delay period after output of the input detection signal until output of the switching signal to the ATC circuit 250 can be made longer as compared to when the level of the burst signal is relatively low.

As described above, the delay control circuit 242 (the switching circuit 150) may be implemented by the integrator circuit that integrates the input detection signal by the time constant switchable according to the level detected by the input level detection circuit 241 (the level detection circuit 140).

Figure 15:
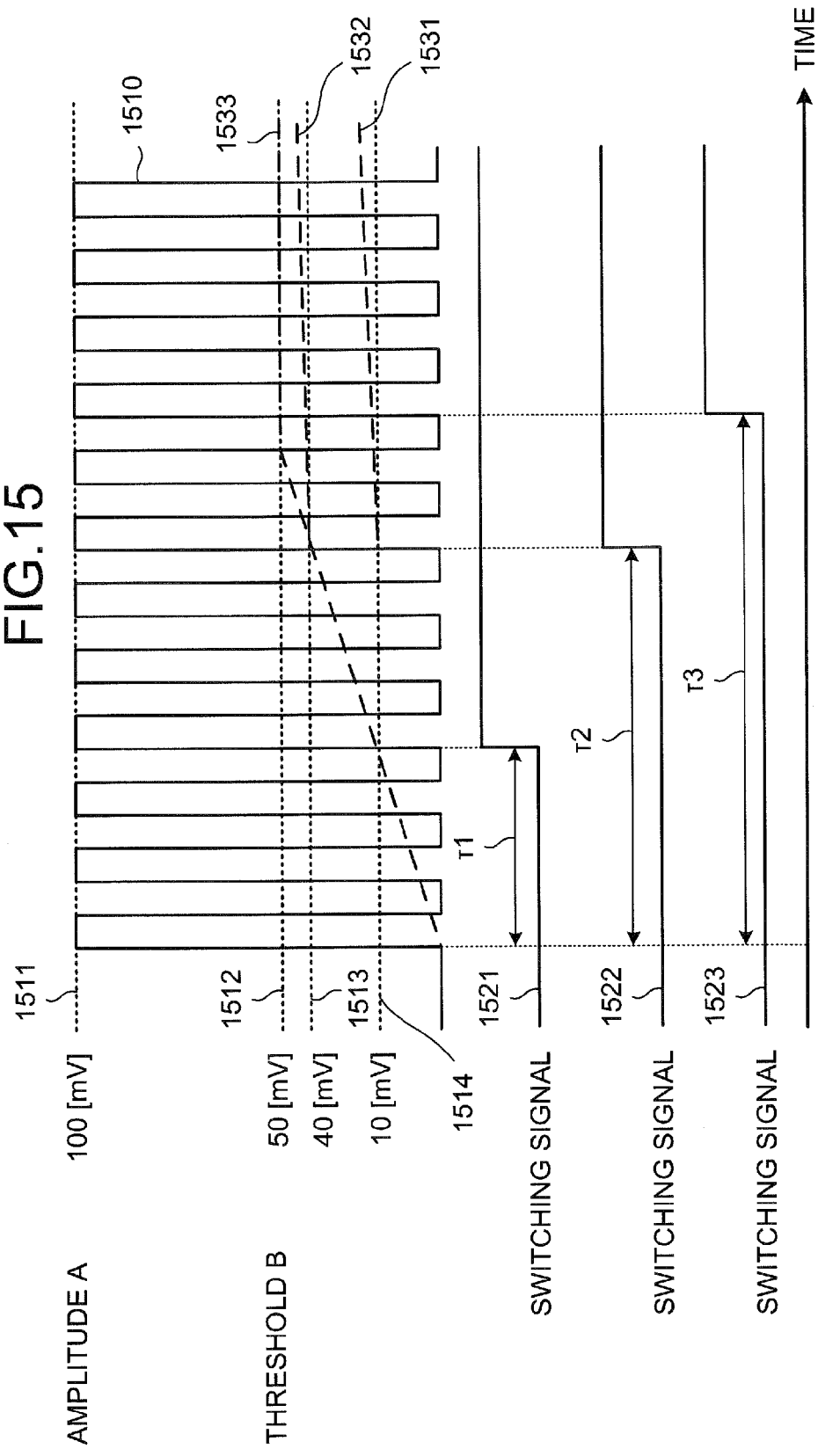
FIG. 15 is a diagram of an example of duty ratio improvement effect.

FIG. 15 is a diagram of an example of duty ratio improvement effect. In FIG. 15, the horizontal axis indicates time. The vertical direction indicates the level of each signal. A burst signal 1510 indicates a burst signal output from the TIA 220. In FIG. 15, description will be made of a case where the level of the burst signal 1510 is relatively high. Amplitude A indicates the amplitude of the burst signal 1510. In the example depicted in FIG. 15, the amplitude A of the burst signal 1510 is 100 [mV]. A threshold B is a threshold output from the ATC circuit 250 to the amplifier 232. Thresholds 1512 to 1514 correspond to the threshold B at 50, 40, 10 [mV], respectively.

Switching signals 1512 to 1523 are switching signals output from the delay control circuit 242. Delay periods τ1 to τ3 are delay periods of the output (rise) of the switching signals 1521 to 1523, respectively. The delay period τ1 is the shortest delay period among the delay periods τ1 to τ3. The delay period τ3 is the longest delay period among the delay periods τ1 to τ3.

Thresholds 1531 to 1533 are thresholds output from the ATC circuit 250 and correspond to the switching signals 1521 to 1523, respectively. If the switching signal 1521 is input to the ATC circuit 250, the time constant of the timing control circuit 240 is switched from high speed to low speed when the threshold detected by the ATC circuit 250 is 10 [mV] and therefore, the threshold detected by the ATC circuit 250 is as indicated by the threshold 1531.

If the switching signal 1522 is input to the ATC circuit 250, the time constant of the timing control circuit 240 is switched from high speed to low speed when the threshold detected by the ATC circuit 250 is 40 [mV] and therefore, the threshold detected by the ATC circuit 250 is as indicated by the threshold 1532. If the switching signal 1523 is input to the ATC circuit 250, the time constant of the timing control circuit 240 is switched from high speed to low speed when the threshold detected by the ATC circuit 250 is 50 [mV] and therefore, the threshold detected by the ATC circuit 250 is as indicated by the threshold 1533.

A variation amount of the duty ratio of the signal (normal signal Qout) output from the amplifier 232 to the CDR circuit 260 can be expressed by 50−((B/A)*100), for example. Therefore, if the time constant of the ATC circuit 250 is switched from high speed to low speed when the threshold B is 10 [mV] as in the case of the threshold 1531, the variation of the duty ratio is 50−((10/100)*100)=40%.

On the other hand, if the time constant of the ATC circuit 250 is switched from high speed to low speed when the threshold B is 40 [mV] as in the case of the threshold 1532, the variation of the duty ratio of the signal output from the amplifier 232 is 50−((40/100)*100)=10%. If the time constant of the ATC circuit 250 is switched from high speed to low speed when the threshold B is 50 [mV] as in the case of the threshold 1533, the variation of the duty ratio of the signal output from the amplifier 232 is 50−((50/100)*100)=0%.

According to the optical receiving apparatus 200, when the level of the burst signal 1510 is relatively high, the delay period of the switching signal output from the delay control circuit 242 can be made relatively longer (e.g., the delay periods τ2 and τ3). As a result, the variation in duty ratio of the signal output from the amplifier 232 can be suppressed (e.g., to 10% or 0%).

As described above, according to the optical receiving apparatus 200 of the second embodiment, the variation in threshold can be suppressed by applying the detecting apparatus 100 of the first embodiment. This enables the suppression of variation in duty ratio of a signal obtained from comparison between the burst signal and the threshold (e.g., differential amplification). As a result, data indicated by the received optical burst signal may be determined accurately to improve reception quality.

Figure 16:
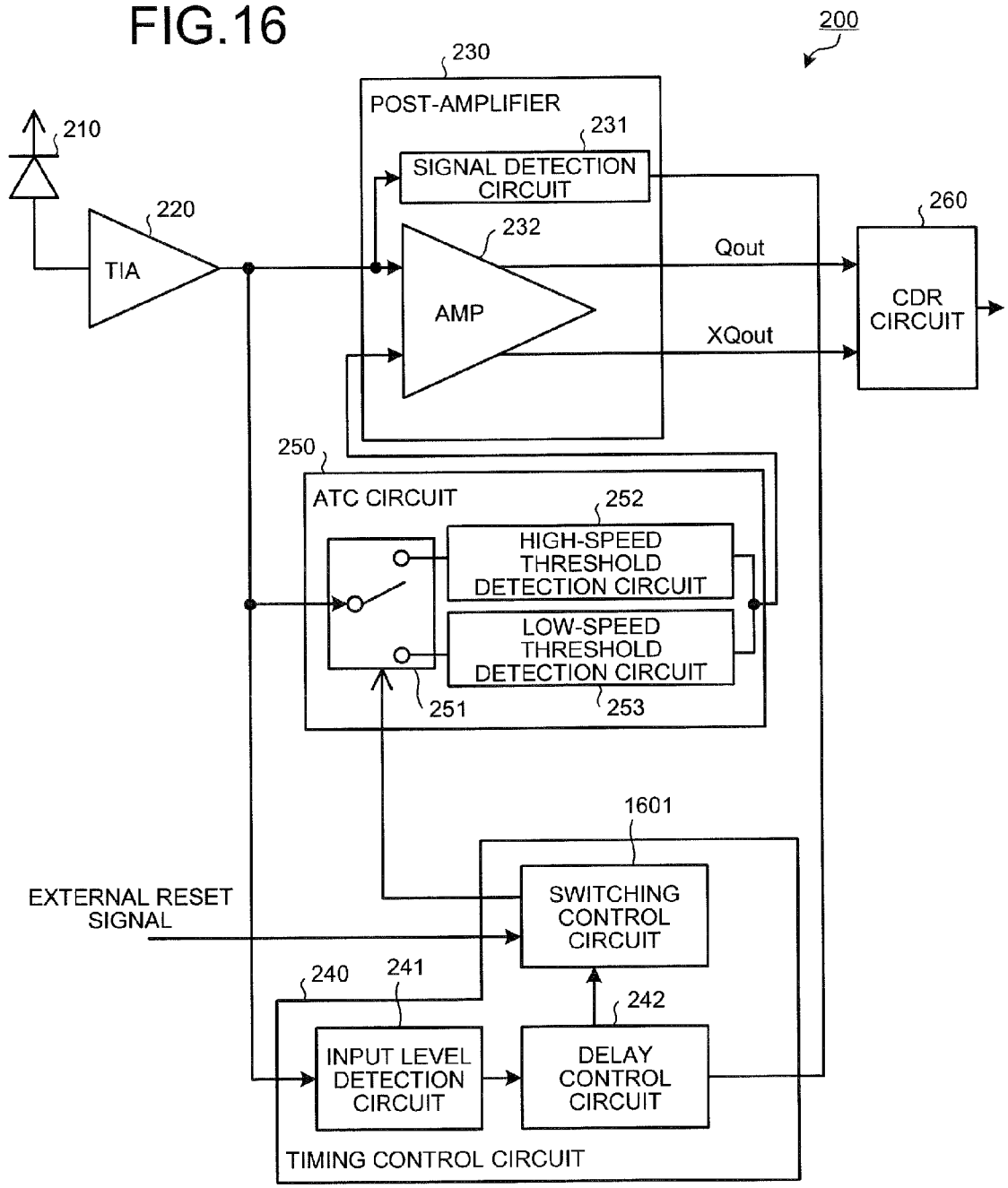
FIG. 16 is a diagram of an example of a configuration of the optical receiving apparatus according to a third embodiment.

FIG. 16 is a diagram of an example of a configuration of the optical receiving apparatus according to a third embodiment. In FIG. 16, portions identical to the portions depicted in FIG. 2 are denoted by the same reference numerals used in FIG. 2 and will not be described. As depicted in FIG. 16, the timing control circuit 240 of the optical receiving apparatus 200 according to the third embodiment includes a switching control circuit 1601 in addition to the configuration depicted in FIG. 2.

The delay control circuit 242 outputs a switching signal to the switching control circuit 1601. An external reset signal and the switching signal from the delay control circuit 242 are input to the switching control circuit 1601. For example, when the optical receiving apparatus 200 is applied to the OLT side of the PON, the external reset signal is input to the optical receiving apparatus 200 immediately before an optical burst signal is input to the optical receiving apparatus 200. Therefore, the external reset signal is a predetermined signal input from an external source (from a higher-level apparatus) before the input of the optical burst signal each time the optical burst signal is input.

The switching control circuit 1601 controls the switching of the time constant of the ATC circuit 250. For example, the switching control circuit 1601 outputs the switching signal output from the delay control circuit 242 to the ATC circuit 250, thereby switching the time constant of the ATC circuit 250 from high speed to low speed. When the external reset signal is input, the switching control circuit 1601 outputs the switching signal to the ATC circuit 250 to switch the time constant of the ATC circuit 250 from low speed to high speed.

The amplifier 232 and the CDR circuit 260 may be disposed external to the optical receiving apparatus 200 and the optical receiving apparatus 200 may be configured as a detecting apparatus for a threshold.

Figure 17:
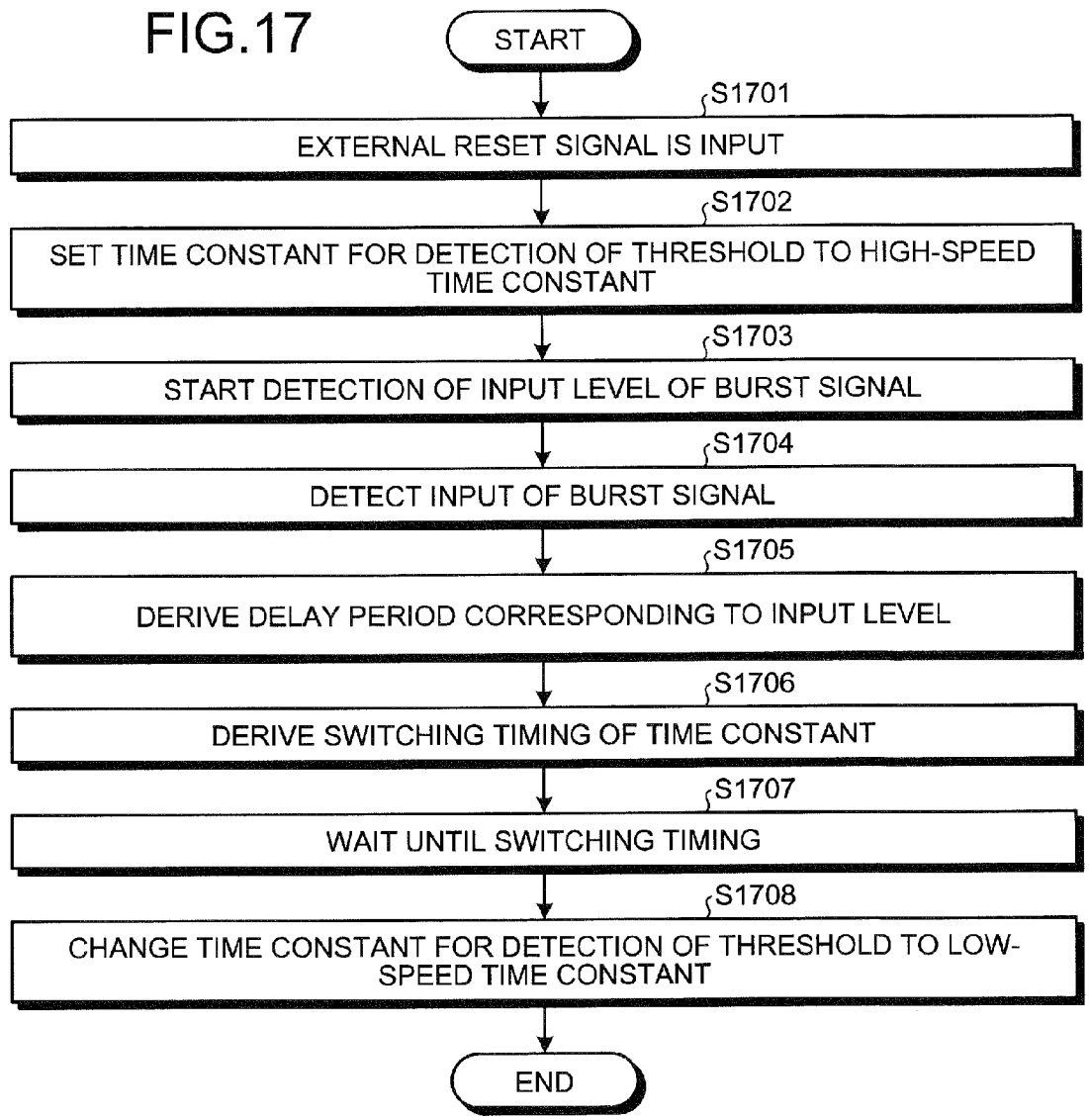
FIG. 17 is a flowchart of an example of operation of the optical receiving apparatus.

FIG. 17 is a flowchart of an example of the operation of the optical receiving apparatus. The optical receiving apparatus 200 depicted in FIG. 16 operates as indicated by the steps in FIG. 17 for the time constant switching operation, for example. When the external reset signal is input to the switching control circuit 1601 (step S1701), the switching control circuit 1601 outputs a switching signal to the analogue switch 251 to set to a high-speed time constant, the time constant for detection of the threshold in the ATC circuit 250 (step S1702). Steps S1702 to S1708 depicted in FIG. 17 are the same as steps S421 to S427 depicted in FIG. 4-2. For example, the optical receiving apparatus 200 repeats the steps depicted in FIG. 17.

As described above, the input of the external reset signal before input of the burst signal triggers the switch of the time constant of the ATC circuit 250 to the high-speed time constant. As a result, the time constant of the ATC circuit 250 can be set to the high-speed time constant before the input of the burst signal to detect the threshold of the rising portion of the burst signal with the high-speed time constant. Therefore, the threshold of the rising portion of the burst signal can accurately be detected.

Figure 18:
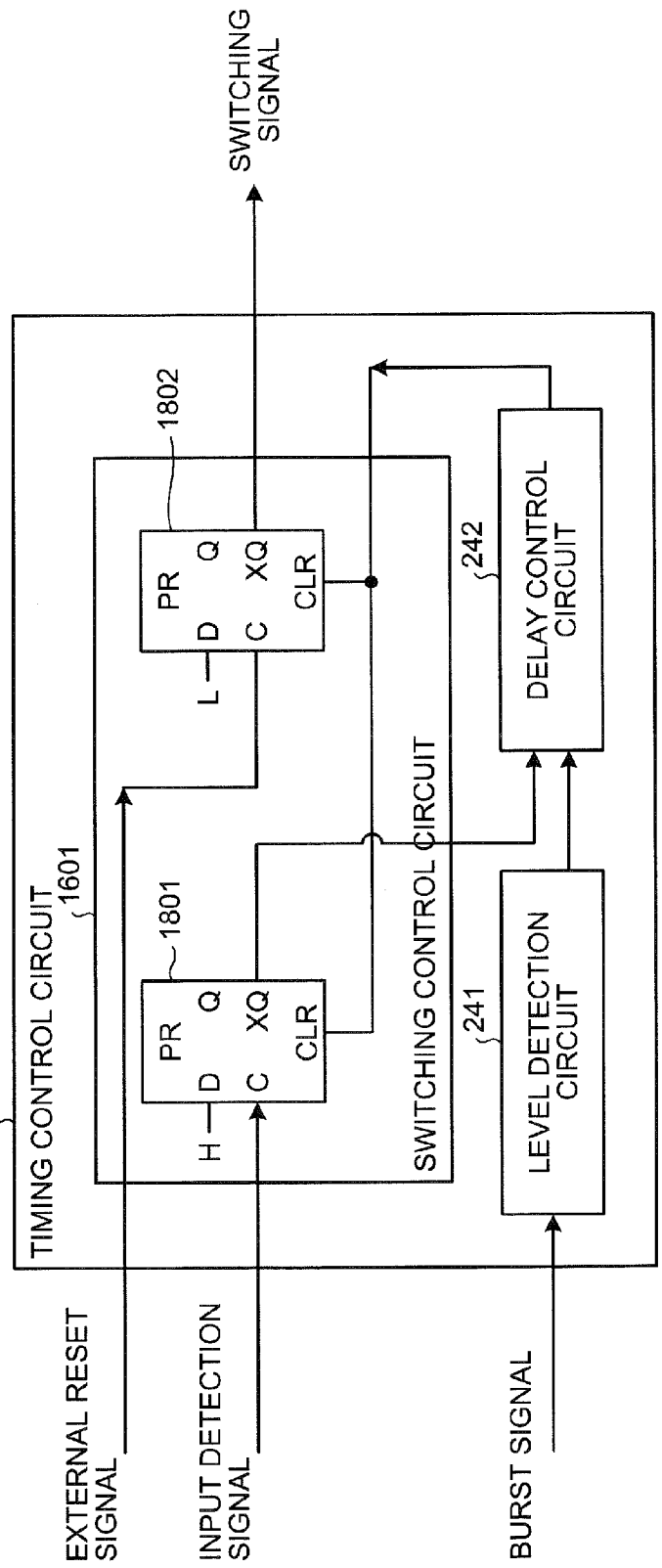
FIG. 18 is a diagram of an example of a configuration of a timing control circuit.

FIG. 18 is a diagram of an example of a configuration of the timing control circuit. As depicted in FIG. 18, the switching control circuit 1601 of the timing control circuit 240 depicted in FIG. 16 includes flip-flop circuits 1801 and 1802. Each of the flip-flop circuits 1801 and 1802 is a D-type flip-flop circuit in which a value of a D-input is retained as Q-output at the rising edge of a C (clock) terminal.

The input detection signal output from the signal detection circuit 231 is input to the C (clock) terminal of the flip-flop circuit 1801. High (H) is applied to the D-input of the flip-flop circuit 1801. The switching signal from the delay control circuit 242 is input to a CLR terminal of the flip-flop circuit 1801. An XQ-output (inverted output) of the flip-flop circuit 1801 is output as a delayed input detection signal to the delay control circuit 242.

The external reset signal is input to the C (clock) terminal of the flip-flop circuit 1802. Low (L) is applied to the D-input of the flip-flop circuit 1802. The switching signal from the delay control circuit 242 is input to a CLR terminal of the flip-flop circuit 1802. AN XQ-output (inverted output) of the flip-flop circuit 1802 is output as a switching signal to the ATC circuit 250.

Figure 19:
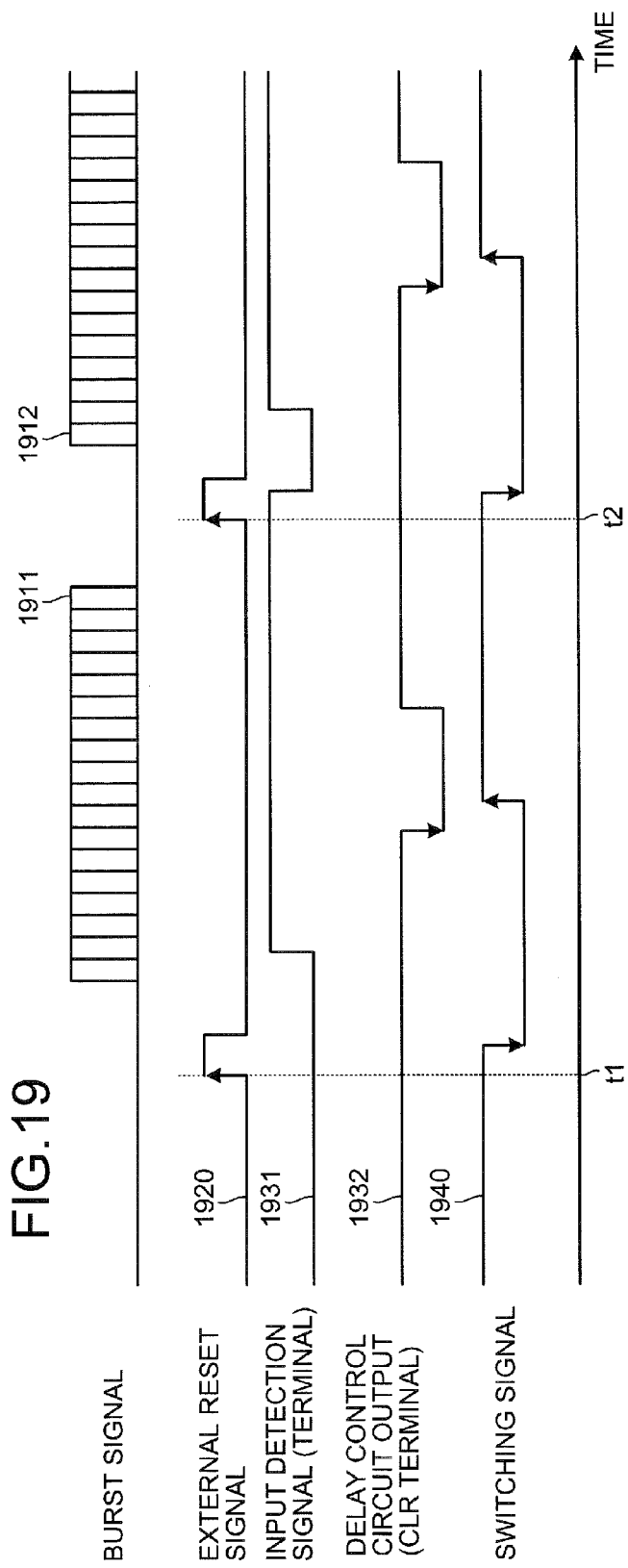
FIG. 19 is a diagram of an example of signals in the delay control circuit.

FIG. 19 is a diagram of an example of signals in the delay control circuit. In FIG. 19, the horizontal axis indicates time. The vertical direction indicates the level of each signal. In FIG. 19, the signals in the timing control circuit 240 depicted in FIG. 18 will be described. Burst signals 1911 and 1912 represent burst signals output from the TIA 220. The burst signal 1912 is a burst signal output after the burst signal 1911.

An external reset signal 1920 is an external reset signal input to the C (clock) terminal of the flip-flop circuit 1802 from the outside of the optical receiving apparatus 200. The external reset signal 1920 is input (rises) at time t11 before the burst signal 1911 is input, and at time t12 before the burst signal 1912 is input.

An input detection signal 1931 is an input detection signal output from the signal detection circuit 231 and input to the C (clock) terminal of the flip-flop circuit 1801. The input detection signal 1931 rises in response to the rise of the burst signal 1911 or 1912 after a delay of a certain period. The input detection signal 1931 rises in response to the fall of the burst signal 1911 or 1912 after a delay of a certain period.

A delay control circuit output 1932 is a switching signal input from the delay control circuit 242 to the CLR terminals of the flip-flop circuits 1801 and 1802. The delay control circuit output 1932 rises in response to the rise of the burst signal 1911 or 1912 after a delay of the time corresponding to the level detection signal output from the input level detection circuit 241.

A switching signal 1940 is a switching signal output from the XQ-output (inverted output) of the flip-flop circuit 1802 to the ATC circuit 250. The switching signal 1940 falls when the external reset signal 1920 rises. As a result, the switching signal 1940 falls before the rise of the burst signal 1911 or 1912. The switching signal 1940 rises when the delay control circuit output 1932 falls. As a result, the switching signal 1940 rises in response to the rise of the burst signal 1911 or 1912 after a delay of the time corresponding to the level detection signal output from the input level detection circuit 241.

Therefore, the time constant of the ATC circuit 250 may be switched to high speed before the rise of the burst signal 1911 or 1912. The time constant of the ATC circuit 250 may be switched to low speed in response to the rise of the burst signal 1911 or 1912 after a delay of the time corresponding to the level detection signal output from the input level detection circuit 241. As a result, a threshold of a rising portion of the burst signal 1911 or 1912 can be detected with the high-speed time constant and a threshold of a portion after the rising portion of the burst signal 1911 or 1912 can be detected with the low-speed time constant.

As described above, the optical receiving apparatus 200 according to the third embodiment acquires a predetermined signal (reset signal) input before the input of the optical burst signal each time the optical burst signal is input. By setting the time constant of the ATC circuit 250 to the high-speed time constant (the first time constant) if the reset signal is acquired, the rising portion of the input burst signal can be detected with the high-speed time constant. Therefore, the threshold of the rising portion of the burst signal may be detected accurately.

FIG. 20 is a diagram of an example of a configuration of the optical receiving apparatus according to a fourth embodiment. In FIG. 20, portions identical to the portions depicted in FIG. 2 are denoted by the same reference numerals used in FIG. 2 and will not be described. As depicted in FIG. 20, the timing control circuit 240 of the optical receiving apparatus 200 according to the fourth embodiment includes an input determination circuit 2001 in addition to the configuration depicted in FIG. 2.

The input level detection circuit 241 outputs a level detection signal indicative of a detected level to the delay control circuit 242 and the input determination circuit 2001. The input determination circuit 2001 detects whether a burst signal is input, based on the level detection signal output from the input level detection circuit 241. For example, the input determination circuit 2001 determines that an optical burst signal has been input if the level indicated by the level detection signal exceeds a threshold. When the input of the optical burst signal is detected, the signal detection circuit 231 outputs an input detection signal to the delay control circuit 242.

In this case, the optical receiving apparatus 200 may have a configuration that omits the signal detection circuit 231 of the post-amplifier 230. As described above, the configuration of detecting the input of the burst signal is not limited to the configuration using the signal detection circuit 231 of the post-amplifier 230 and may use a circuit outside the post-amplifier 230. The post-amplifier 230 and the CDR circuit 260 may be disposed outside of the optical receiving apparatus 200 and the optical receiving apparatus 200 may be configured as a detecting apparatus for a threshold.

As described above, the optical receiving apparatus 200 according to the fourth embodiment can acquire the same effects as the optical receiving apparatus 200 according to the second embodiment and can detect the input of the burst signal with the input determination circuit 2001 outside the post-amplifier 230. Therefore, for example, the configuration detecting the level of the burst signal can be excluded from the post-amplifier 230 and thus, the circuit size can be reduced.

An aspect of the embodiments enables reception quality to be improved.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A detecting apparatus comprising:
a threshold detection circuit that detects by a switchable time constant, a threshold of a level of an input optical burst signal;
an input detection circuit that detects input of the optical burst signal;
a level detection circuit that detects a level of the optical burst signal;
a switching circuit that switches the time constant when a period that corresponds to the level detected by the level detection circuit has elapsed after the input is detected by the input detection circuit; and
an output circuit that outputs the threshold detected by the threshold detection circuit.

2. The detecting apparatus according to claim 1, wherein the switching circuit sets the time constant to a first time constant before switching the time constant and switches the time constant to a second time constant that is greater than the first time constant when switching the time constant.

3. The detecting apparatus according to claim 1, wherein the threshold detection circuit detects an average value of the level of the optical burst signal as the threshold.

4. The detecting apparatus according to claim 1, comprising an optoelectronic converter that opto-electronically converts the input optical burst signal, wherein
the threshold detection circuit detects a threshold of a burst signal converted into an electrical signal by the optoelectronic converter,
the input detection circuit detects input of the burst signal, and
the level detection circuit detects a level of the burst signal.

5. The detecting apparatus according to claim 1, wherein the switching circuit increases the period as the level increases.

6. The detecting apparatus according to claim 1, wherein the level detection circuit detects a peak level of the optical burst signal.

7. The detecting apparatus according to claim 1, wherein the level detection circuit detects a bottom level of the optical burst signal.

8. The detecting apparatus according to claim 1, wherein the level detection circuit detects an average value of the level of the optical burst signal.

9. The detecting apparatus according to claim 1, wherein the threshold detection circuit is implemented by an integrator circuit that integrates an average value of the level of the optical burst signal by the switchable time constant.

10. The detecting apparatus according to claim 1, wherein
the input detection circuit outputs an input detection signal that rises when the input is detected, and
the switching circuit is implemented by an integrator circuit that integrates by a time constant that is switchable according to the level detected by the level detection circuit, the input detection signal output by the input detection circuit.

11. The detecting apparatus according to claim 2, wherein the switching circuit acquires a predetermined signal input before input of the optical burst signal each time the optical burst signal is input and switches the time constant to the first time constant if the predetermined signal is acquired.

12. An optical receiving apparatus comprising:
a threshold detection circuit that detects by a switchable time constant, a threshold of a level of an input optical burst signal;
an input detection circuit that detects input of the optical burst signal;
a level detection circuit that detects a level of the optical burst signal;
a switching circuit that switches the time constant when a period that corresponds to the level detected by the level detection circuit has elapsed after the input is detected by the input detection circuit;
a determination circuit that based on the threshold detected by the threshold detection circuit, determines data indicted by the optical burst signal; and
an output circuit that outputs the data determined by the determination circuit.

13. A detecting method comprising:
detecting by a switchable time constant, a threshold of a level of an input optical burst signal;
detecting input of the optical burst signal;
detecting a level of the optical burst signal;
switching the time constant when a period corresponding to the detected level has elapsed after the input is detected; and
outputting the detected threshold.

* * * * *